US009210666B2

United States Patent
Gaal et al.

(10) Patent No.: US 9,210,666 B2
(45) Date of Patent: Dec. 8, 2015

(54) METHOD AND APPARATUS FOR UPLINK TRANSMISSION POWER CONTROL AND TIMING IN COORDINATED MULTIPOINT TRANSMISSION SCHEMES

(71) Applicant: QUALCOMM Incorporated, San Diego, CA (US)

(72) Inventors: Peter Gaal, San Diego, CA (US); Wanshi Chen, San Diego, CA (US); Juan Montojo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 13/633,795

(22) Filed: Oct. 2, 2012

(65) Prior Publication Data

US 2013/0083730 A1     Apr. 4, 2013

Related U.S. Application Data

(60) Provisional application No. 61/542,656, filed on Oct. 3, 2011.

(51) Int. Cl.
*H04W 52/16* (2009.01)
*H04W 52/40* (2009.01)
(Continued)

(52) U.S. Cl.
CPC ............ *H04W 52/16* (2013.01); *H04W 52/244* (2013.01); *H04W 52/40* (2013.01); *H04W 52/08* (2013.01); *H04W 52/10* (2013.01); *H04W 52/146* (2013.01); *H04W 52/242* (2013.01)

(58) Field of Classification Search
None
See application file for complete search history.

(56) References Cited

U.S. PATENT DOCUMENTS 6,442,398 B1 *  8/2002 Padovani et al. ............... 455/522
7,738,907 B2     6/2010 Xiao et al.
(Continued)

FOREIGN PATENT DOCUMENTS

EP       1077531 A1    2/2001
JP     2000261374 A    9/2000
(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre ; 650, Route Des Lucioles; F-06921 Sophia-Antipolis Cedex; France, vol. RAN WG1, No. V10.3.0, Sep. 25, 2011, pp. 1-122, XP050553950 [retrieved on Sep. 25, 2011].
(Continued)

*Primary Examiner* — Ayaz Sheikh
*Assistant Examiner* — Peter Chau
(74) *Attorney, Agent, or Firm* — Arent Fox LLP

(57) ABSTRACT

A method, an apparatus, and a computer program product for wireless communication are provided. The apparatus of a first cell communicates with a second cell in relation to a coordinated multipoint (CoMP) transmission of control information by the second cell and data by the first cell to a user equipment (UE) in a range expanded region of the first cell, determines a desired transmission power level for an uplink transmission to the first cell by the UE, and provides the desired transmission power level for the uplink transmission to the second cell.

28 Claims, 22 Drawing Sheets

(51) Int. Cl.
*H04W 52/08* (2009.01)
*H04W 52/10* (2009.01)
*H04W 52/14* (2009.01)
*H04W 52/24* (2009.01)

(56) References Cited

U.S. PATENT DOCUMENTS

| | | | |
|---|---|---|---|
| 7,890,130 | B2 | 2/2011 | Sung et al. |
| 7,986,959 | B2 | 7/2011 | Malladi et al. |
| 2006/0040619 | A1 | 2/2006 | Cho et al. |
| 2007/0082620 | A1* | 4/2007 | Zhang et al. ............ 455/69 |
| 2010/0119000 | A1 | 5/2010 | Kim et al. |
| 2010/0246705 | A1 | 9/2010 | Shin et al. |
| 2011/0098054 | A1 | 4/2011 | Gorokhov et al. |
| 2011/0218015 | A1 | 9/2011 | Morimoto et al. |
| 2011/0249620 | A1* | 10/2011 | Yu et al. ............ 370/328 |
| 2011/0319121 | A1 | 12/2011 | Jen |
| 2012/0004007 | A1 | 1/2012 | Zhou et al. |
| 2012/0149428 | A1 | 6/2012 | Yang |
| 2012/0329503 | A1* | 12/2012 | Jongren et al. ............ 455/509 |
| 2013/0028199 | A1 | 1/2013 | Song et al. |
| 2013/0083731 | A1 | 4/2013 | Gaal et al. |
| 2013/0084913 | A1 | 4/2013 | Gaal et al. |
| 2013/0153298 | A1* | 6/2013 | Pietraski et al. ............ 175/45 |
| 2013/0176953 | A1* | 7/2013 | Stern-Berkowitz et al. .. 370/329 |
| 2013/0223235 | A1* | 8/2013 | Hu et al. ............ 370/242 |
| 2013/0265981 | A1 | 10/2013 | Yang et al. |
| 2013/0272158 | A1* | 10/2013 | Park et al. ............ 370/252 |
| 2013/0273857 | A1 | 10/2013 | Zhang et al. |
| 2014/0064251 | A1* | 3/2014 | Skov et al. ............ 370/331 |

FOREIGN PATENT DOCUMENTS

| | | | |
|---|---|---|---|
| JP | 2011040832 | A | 2/2011 |
| JP | 2011511482 | A | 4/2011 |
| RU | 2013104978 | A | 10/2014 |
| WO | 2008101055 | | 8/2008 |
| WO | 2009023228 | A1 | 2/2009 |
| WO | 2010124241 | A2 | 10/2010 |
| WO | 2010148532 | A1 | 12/2010 |
| WO | 2011/054374 | A1 | 5/2011 |

OTHER PUBLICATIONS

Ericsson et al: "Enhancements to UL Power Control for Rel-11", 3GPP Draft; R1-112088, 3rd Generation Partnership Project (3GPP), Mobile Competence Centre ; 650, Route Des Lucioles ; F-06921 Sophia-Antipolis Cedex; France, vol. RAN WG1, no. Athens, Greece; 20110822, Aug. 17, 2011, XP050537742 [retrieved on Aug. 17, 2011].

Huawei et al: "Multiple Timing Advance for Carrier Aggregation in Rel-11", 3GPP Draft; R1-112029, 3rd Generation Partnership Project (3GPP), Mobile Competence Centre ; 650, Route Des Lucioles; F-06921 Sophia-Antipolis Cedex; France, vol. RAN WG1, no. Athens, Greece; 20110822, Aug. 17, 2011, XP050537733 [retrieved on Aug. 17, 2011].

International Search Report and Written Opinion—PCT/US2012/000503—ISA/EPO—Jan. 28, 2013.

Qualcomm Incorporated: "Comparison of CoMP Scenarios 3 and 4", 3GPP Draft; R1-111686 Comparison of Comp Scenarios 3 and 4, 3rd Generation Partnership Project (3GPP), Mobile Competence Centre ; 650, Route Des Lucioles ; F-06921 Sophia-Antipolis Cedex; France, vol. RAN WG1, no. Barcelona, Spain; 20110509, May 3, 2011, XP050491307 [retrieved on May 3, 2011].

European Office Action dated Jun. 24, 2015, for European Patent Application No. 12799345.9-1855, 6 pages.

Qualcomm Incorporated: "Uplink timing advance", 3GPP TSG-RAN WG1 #70, R1-123695, Aug. 5, 2012, pp. 1-6.

Qualcomm Incorporated: "Uplink power control issues in Comp", 3GPP Draft; R1-120556 UL Power Control in Comp, 3RD Generation Partnership Project (3GPP), Mobile Competence Centre; 650, Route des Lucioles; F-06921 Sophia-Antipolis Cedex; France, vol. RAN WG1, No. Dresden, Germany; 20120206-20120210, Jan. 31, 2012, XP050562994, [retrieved on Jan. 31, 2012], pp. 1-4.

Translation of Japanese Office Action for Japanese Application No. 2014-534545 dated Feb. 3, 2015, 6 pages.

Translation of Korean Office Action for Korean Application No. 2014-7011971 dated May 19, 2015, 6 pages.

Huawei, Hisilicon, "Discussion on the operation and performance of CoMP in scenarios 3 and 4", 3GPP TSG RAN WG1 Meeting #65, 3GPP, May 13, 2011, R1-111250, 5 pages.

NTT Docomo: "Views on UL power control for HetNet scenario", 3GPP Draft; R1-112432 ULTPC, 3rd Generation Partnership Project (3GPP), Mobile Competence Centre; 650, Route des Lucioles; F-06921 Sophia-Antipolis Cedex; France, vol. RAN WG1, No. Athens, Greece; 20110822, Aug. 16, 2011, XP050537536, [retrieved on Aug. 16, 2011] p. 1, paragraph 1—p. 2, paragraph 3.2.

Translation of Office Action for Japanese Patent Application No. 2014-534552 dated Jul. 28, 2015, 5 pages.

Aoki H., et al., CE4 Subtest 2: Spatial QP prediction: combination of test 2.3.g, 2.3.f and 2.3.e, Joint Collaborative Team on Video Coding (JCT-VC) of ITU-T SGI6 WP3 and ISO/IEC JTC1/SC29NVG11, JCTVC-F661, 6th Meeting: Torino, Jul. 14-22, 2011 sec.2, Appendix A.

Chono Keiichi et al.,"Proposal of enhanced PCM coding in HEVC", 96. MPEG Meeting; Mar. 21, 2011-Mar. 25, 2011; Geneva; (Motion Picture Expert Group or ISO/IEC JTC1/SC29/WG11) No. m19710, Mar. 21, 2011, XP030048277.

* cited by examiner

METHOD AND APPARATUS FOR UPLINK TRANSMISSION POWER CONTROL AND TIMING IN COORDINATED MULTIPOINT TRANSMISSION SCHEMES

CROSS-REFERENCE TO RELATED APPLICATION(S)

This application claims the benefit of U.S. Provisional Application Ser. No. 61/542,656, entitled "METHOD AND APPARATUS FOR UPLINK TRANSMISSION POWER CONTROL AND TIMING IN COORDINATED MULTI-POINT TRANSMISSION SCHEMES" and filed on Oct. 3, 2011, which is expressly incorporated by reference herein in its entirety.

BACKGROUND

1. Field

The present disclosure relates generally to communication systems, and more particularly, to a method and apparatus for uplink transmission power control and timing in coordinated multipoint transmission schemes.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

On example of an improvement for LTE technology is the use of Coordinated Multipoint Transmission (CoMP) schemes, where multiple base stations such as eNode Bs (eNBs) coordinate DL transmissions to a UE. By coordinating and combining signals received from the eNBs using multiple antennas on the UE, CoMP, will provide consistent performance and quality in accessing and sharing videos, photos and other high-bandwidth services whether the UE is close to the center of an LTE cell or at its outer edges. Thus, CoMP can significantly increase network capacity and performance.

CoMP may be implemented using a variety of schemes. One implementation of a CoMP scheme is a "joint transmission" scheme, where multiple eNBs transmit the same data meant for a UE. In this example, a joint precoding vector spanning all the antennas of all involved eNBs may be used. In another implementation, referred to as a "distributed MIMO" scheme, eNBs transmit different pieces of data meant for a UE as different MIMO layers. For example, a first MIMO layer is transmitted by one eNB, a second MIMO layer is transmitted by another eNB, and so on. In yet another implementation referred to as "coordinated beamforming", an eNB transmits to its associated UEs using beams that are chosen to reduce interference to UEs in neighboring cells.

CoMP may exist in homogeneous networks and/or heterogeneous networks. In heterogeneous networks, a mix of low power base station nodes, or cells, such as pico, femto and relay base stations are used in addition to macro base station nodes, or cells, such as eNBs. In CoMP, the low power nodes may be referred to as remote radio heads (RRHs). The connection between the RRHs and the eNBs may be via an X2 backlink, which is subject to some latency and limited bandwidth issues; or a fiber backlink, which provides minimum latency and relatively unlimited bandwidth.

In a heterogeneous network, the RRHs may or may not have the same cell ID as the macro cell. In the former case, where the RRHs and the macro cell share a common ID, the macro cell and RRHs form a super-cell with centralized scheduling. In the latter case, control and data may be served by different cells. However, power control and timing issues exist with both cases. For example, in certain situations, the UE may derive path loss information from the wrong cell. Further, the UE may also derive timing information from an incorrect source.

Consequently, it would be desirable to address the issues described above.

SUMMARY

In an aspect of the disclosure, a method, a computer program product, and an apparatus are provided. The apparatus receives control information from a first cell, generates an uplink transmission to a second cell based in part on the received control information from the first cell, receives a transmission power setting based on the uplink transmission to the second cell, and transmits in uplink using the transmission power to the second cell.

In a further aspect of the disclosure, the apparatus of a first cell communicates with a second cell in relation to a coordinated multipoint (CoMP) transmission of control information by the second cell and data by the first cell to a user equipment (UE) in a range expanded region of the first cell, determines a desired transmission power level for an uplink transmission to the first cell by the UE, and provides the desired transmission power level for the uplink transmission to the second cell.

In another aspect of the disclosure, the apparatus of a first cell, communicates with a second cell in relation to a coordinated multipoint (CoMP) transmission of control information by the first cell and data by the second cell to a user equipment (UE) in a range expanded region of the second cell, receives a desired transmission power level for the UE from the second cell, generates control information based on the desired transmission power level, and transmits the control information to the UE.

DETAILED DESCRIPTION

Figure 1:
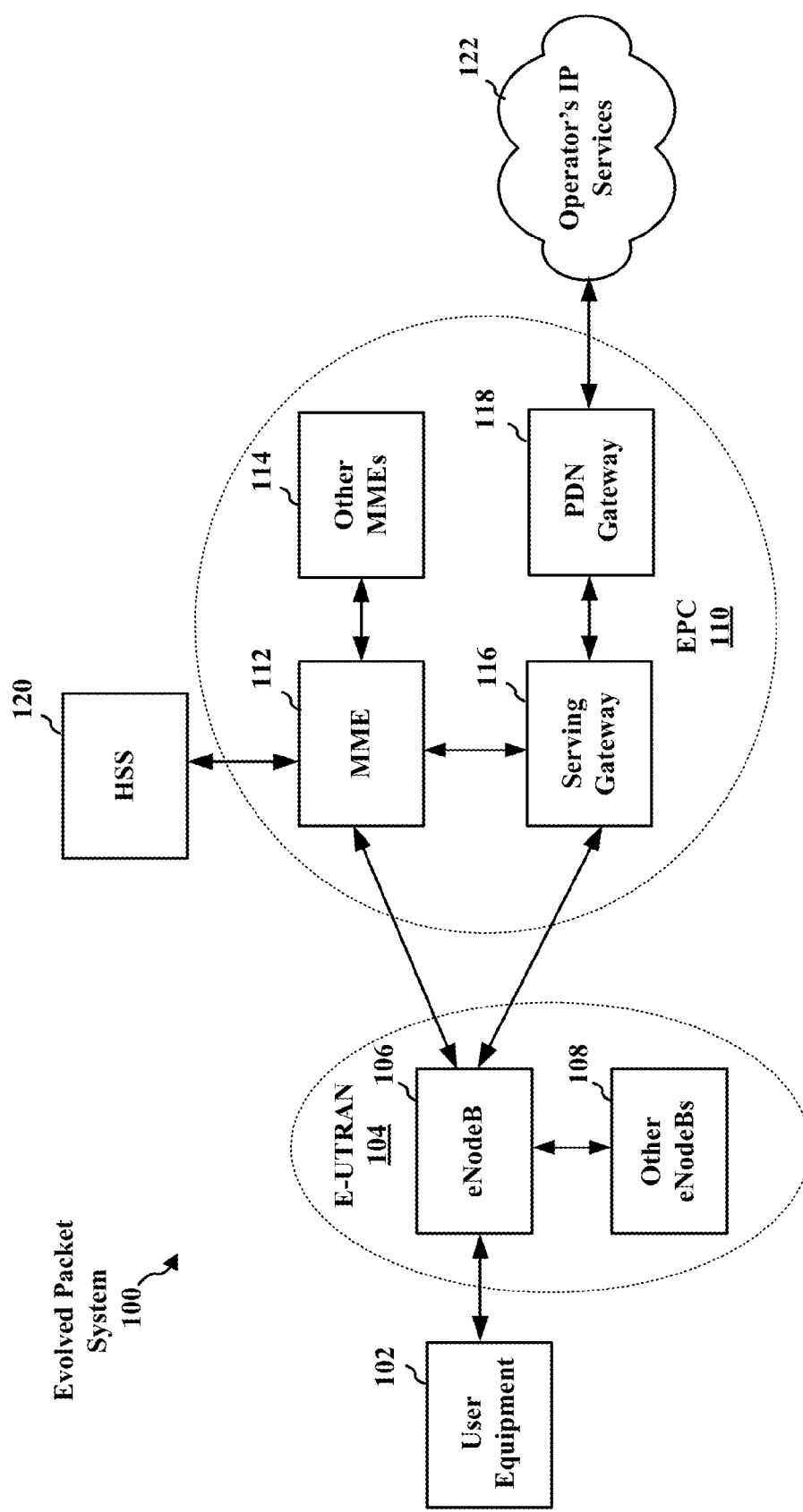
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
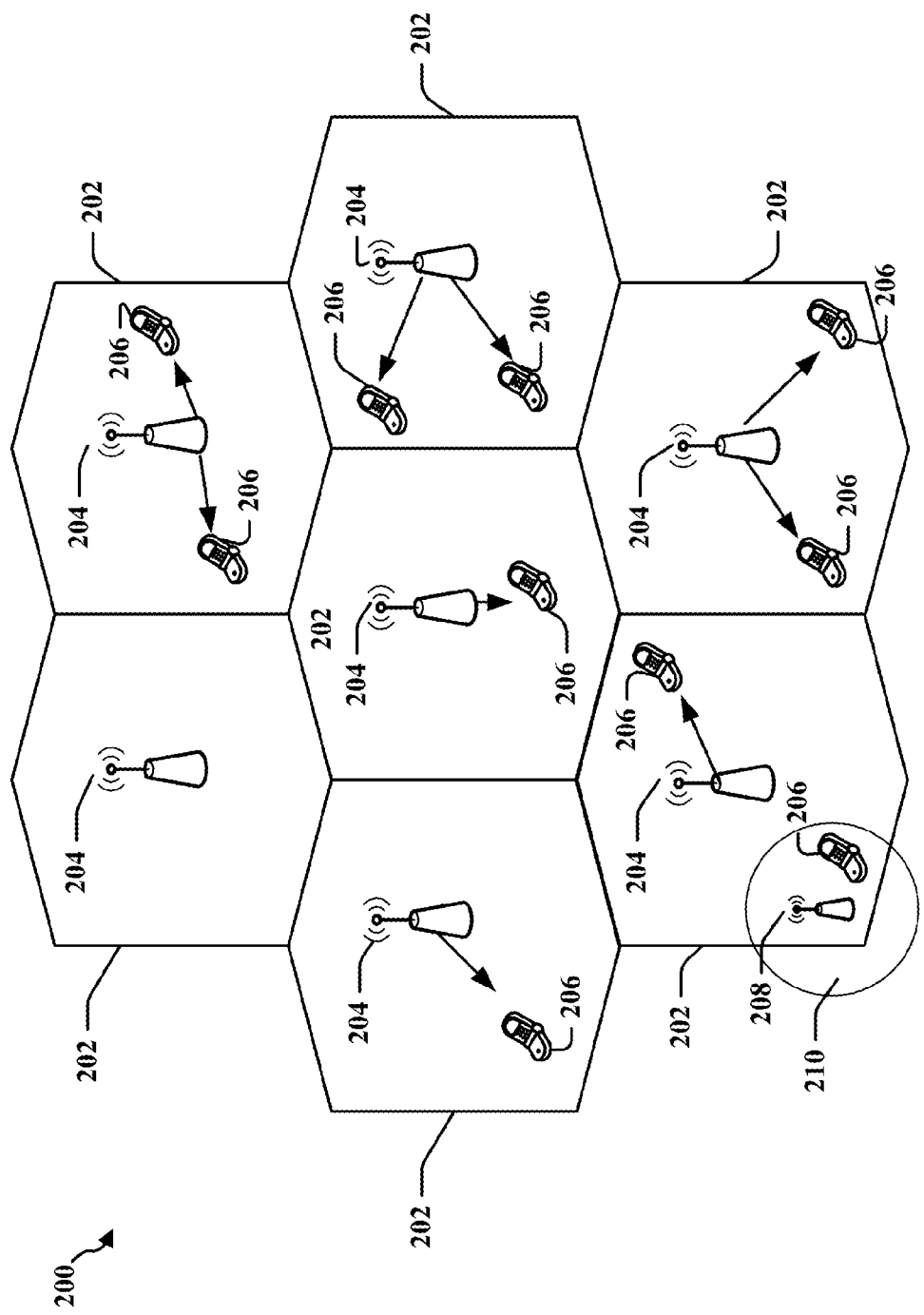
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more low power class eNBs 208 may have cellular regions 210 that overlap with one or more of the cells 202. A low power class eNB 208 may be referred to as a remote radio head (RRH). The low power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The access network 200 may support broadcast, multicast, and unicast services. A broadcast service is a service that may be received by all users, e.g., a news broadcast. A multicast service is a service that may be received by a group of users, e.g., a subscription video service. A unicast service is a service intended for a specific user, e.g., a voice call.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
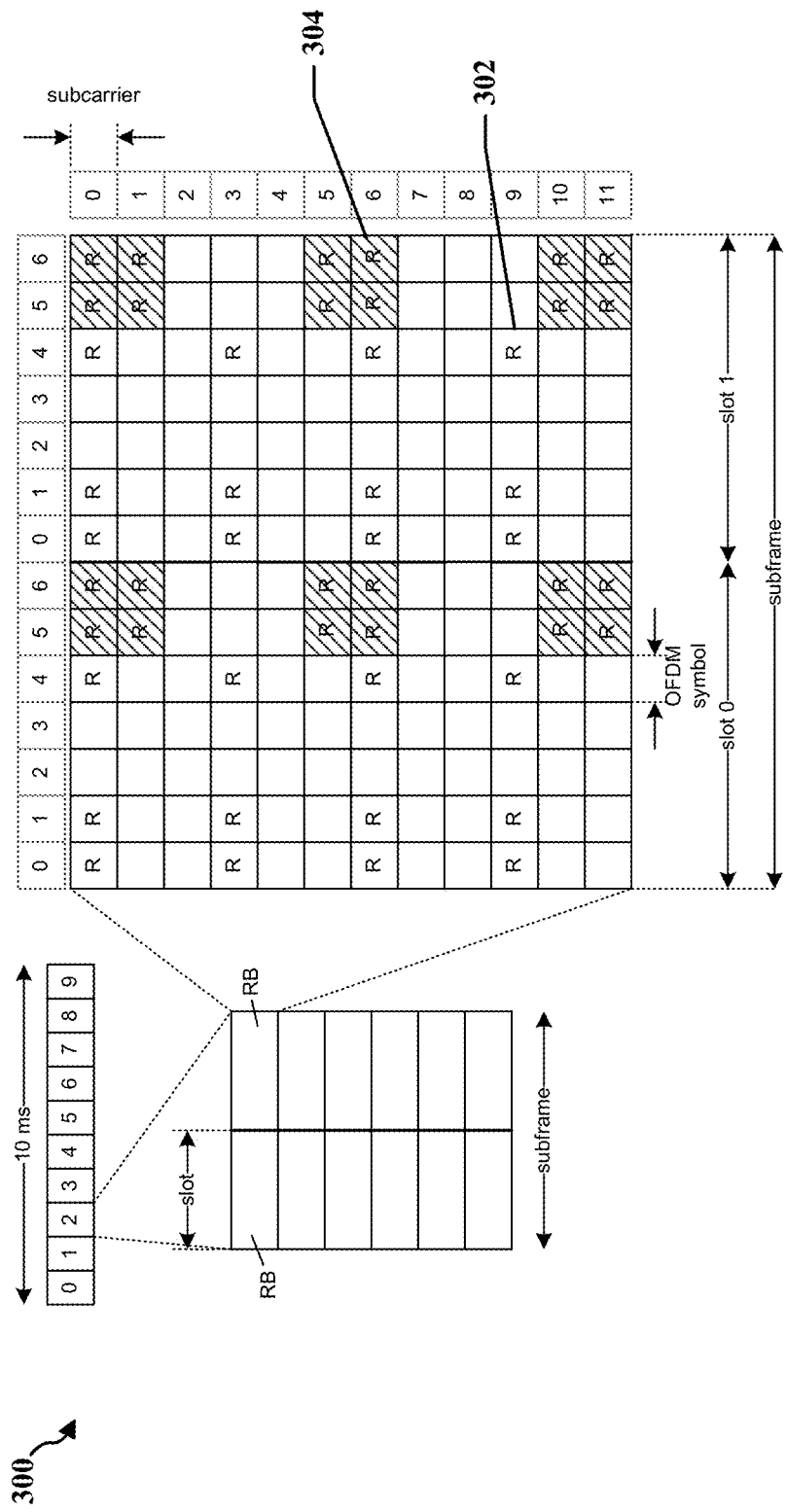
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
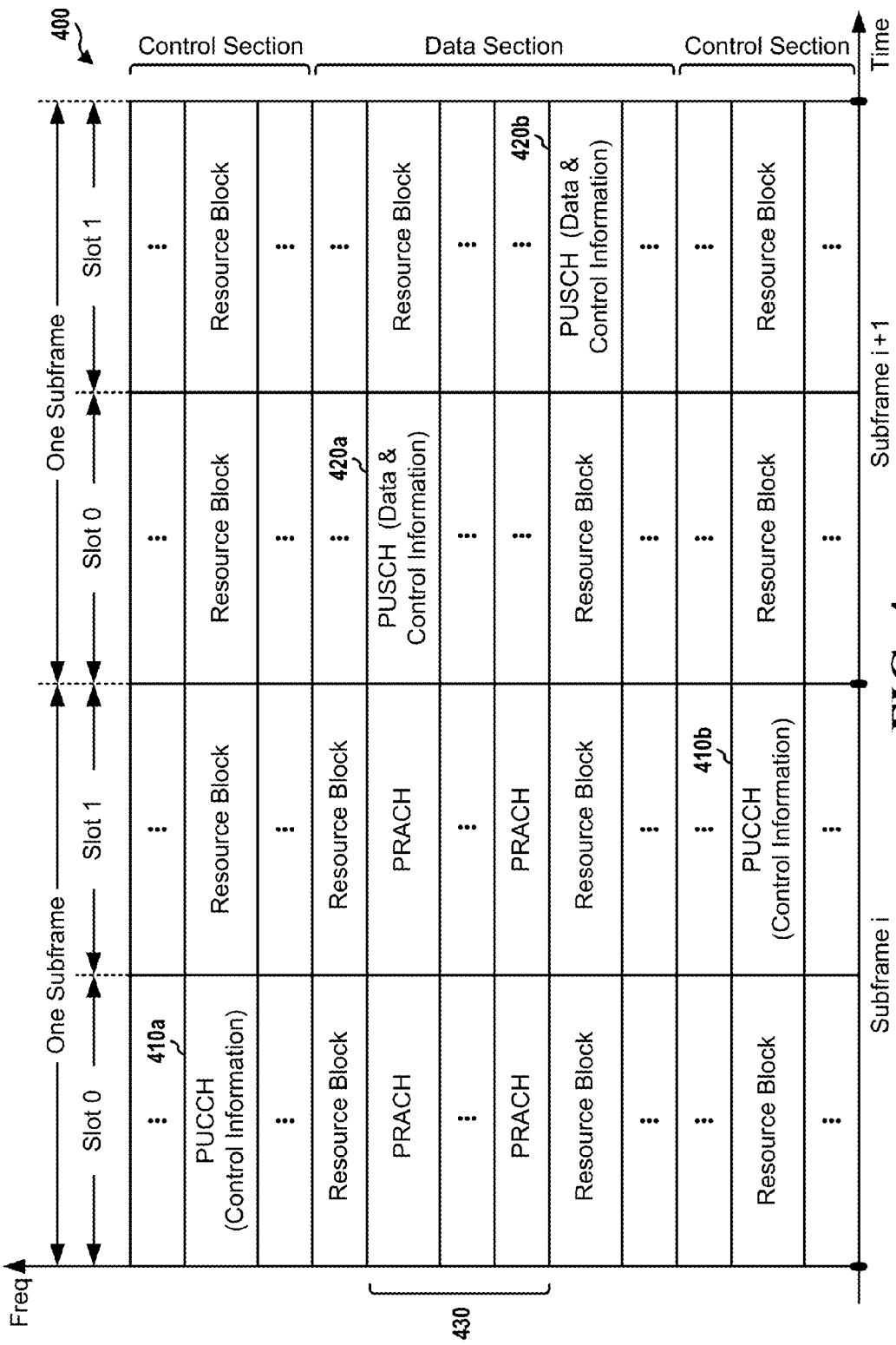
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
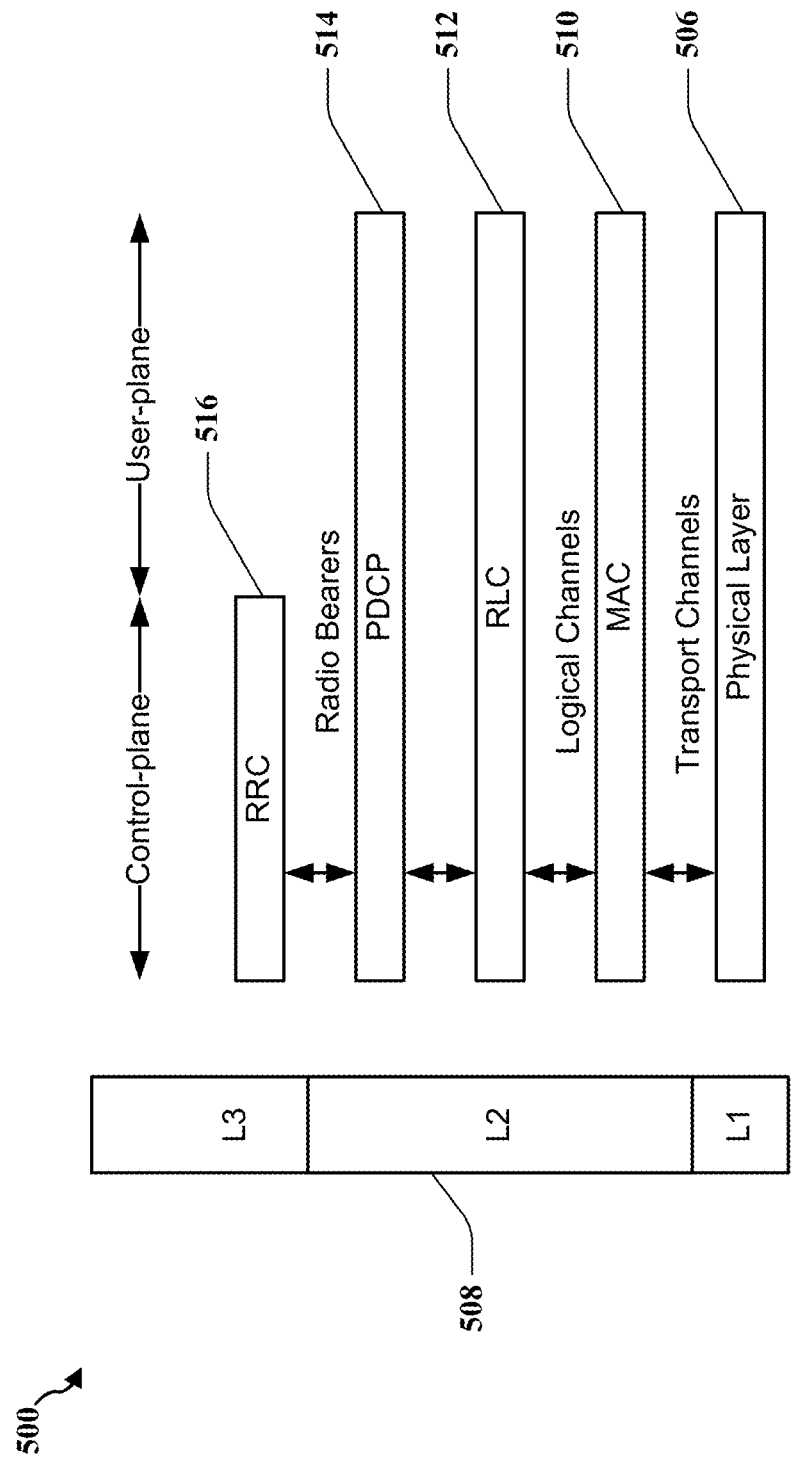
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 108 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
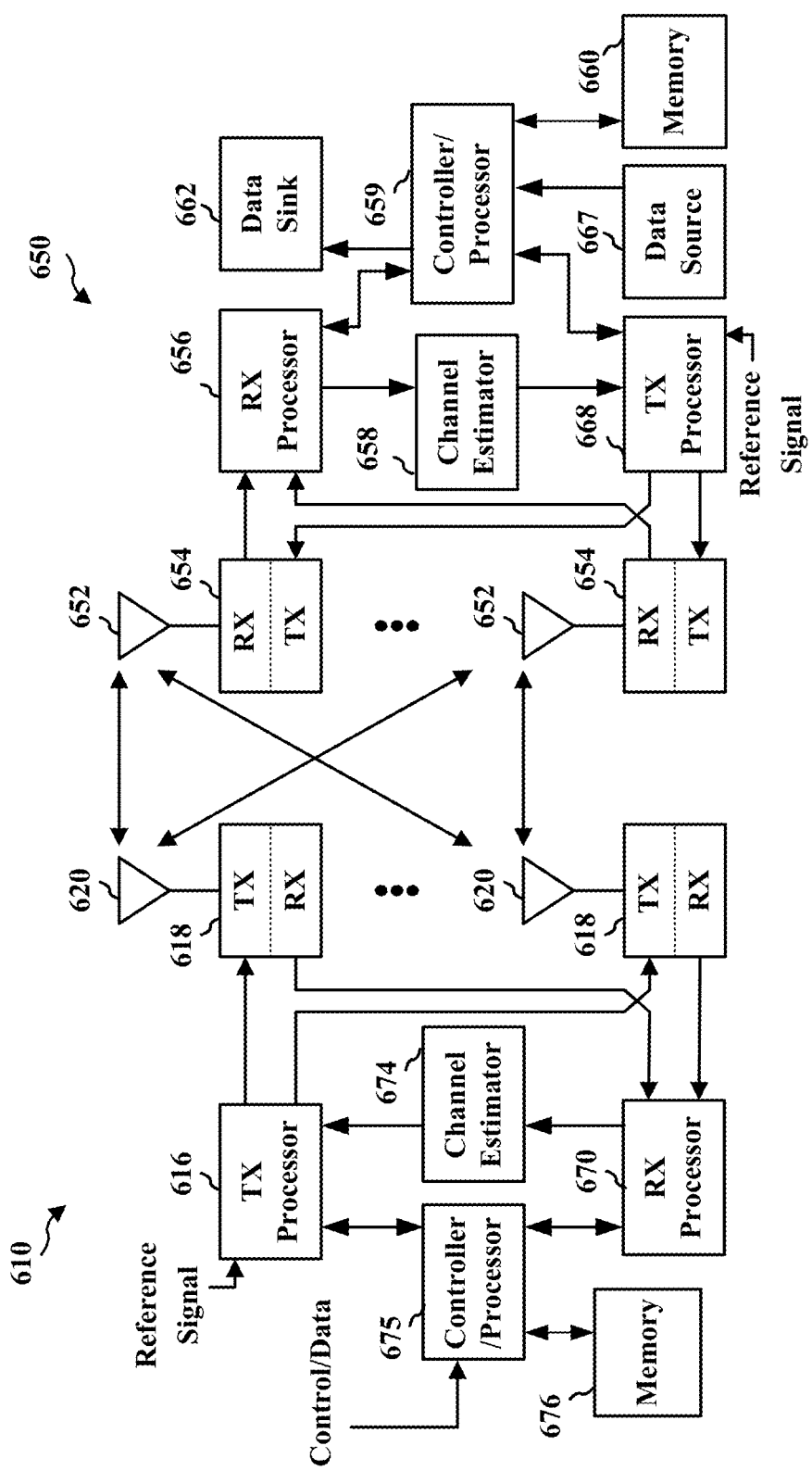
FIG. 6 is a diagram illustrating an example of an evolved Node B (eNB) and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
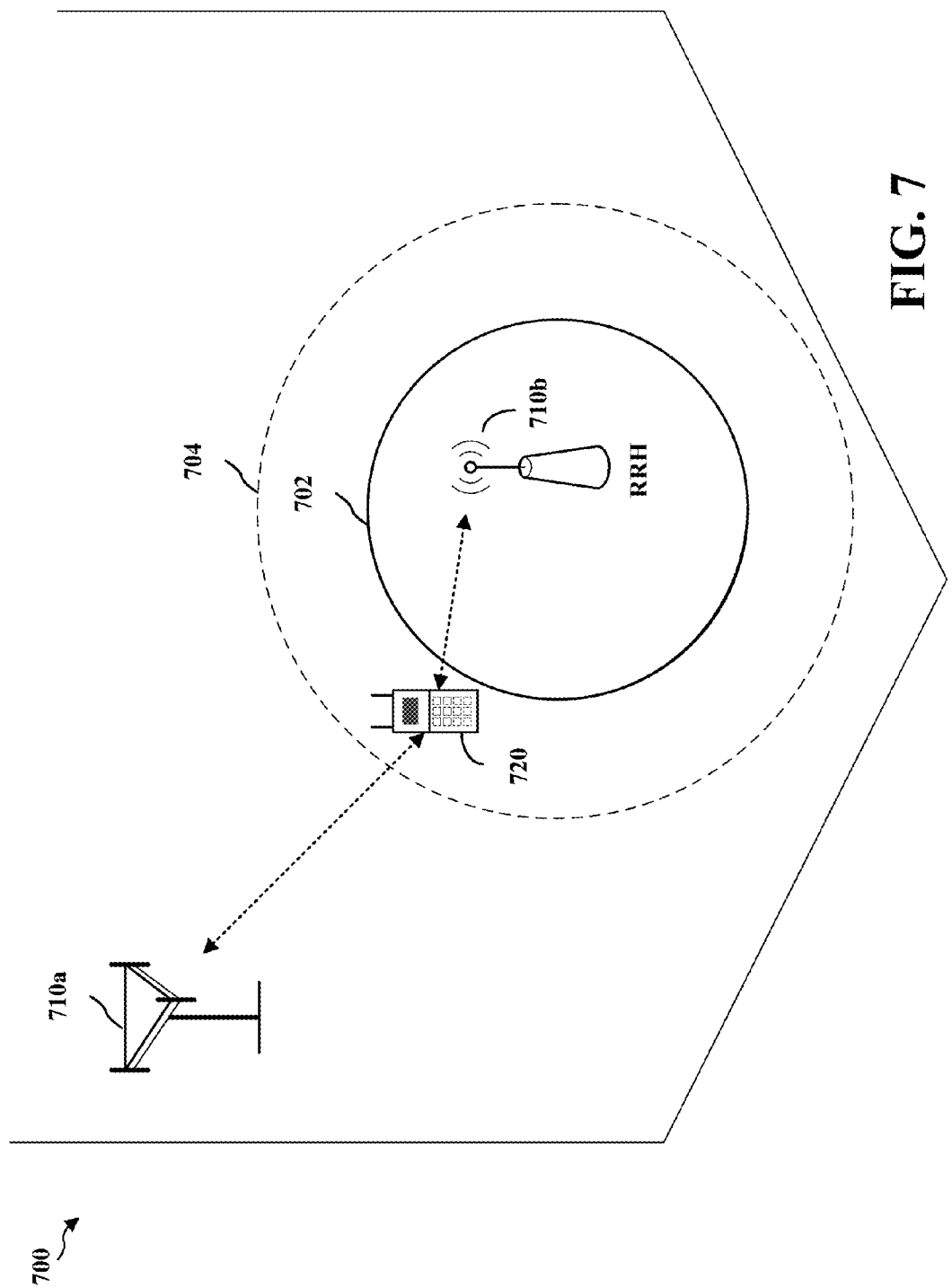
FIG. 7 is a diagram illustrating a range expanded cellular region in a heterogeneous network.

FIG. 7 is a diagram 700 illustrating a range expanded cellular region in a heterogeneous network supporting a UE 720 that includes a macro eNB such as an eNB 710a and a low power class eNB such as an RRH 710b. One way to achieve range expansion is by performing eNB to UE association based on path loss (associating with the eNB with the minimum path loss rather than the eNB with the maximum downlink signal strength) and a fixed partitioning of resources between the macro and pico base stations—eNB 710a and RRH 710b, respectively. The RRH 710b may have a range expanded cellular region 704 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 704 and to accept a handoff of the UE 720 from the macro eNB 710a as the UE 720 enters the range expanded cellular region 704.

In a heterogeneous network with range expansion, in order for a UE to obtain service from an RRH in the presence of macro eNB with stronger downlink signal strength, the RRH needs to perform both control channel and data channel interference coordination with the dominant macro interferers and the UEs need to support advanced receivers for interference cancellation.

Inter-Cell Interference Coordination (ICIC) is critical to heterogeneous network deployment. A basic ICIC technique involves resource coordination amongst interfering base stations, where an interfering base station gives up use of some resources in order to enable control and data transmissions to the UE affected by the interference. More generally, interfering base stations can coordinate on transmission powers and/or spatial beams with each other in order to enable control and data transmissions to their corresponding UEs.

Figure 8:
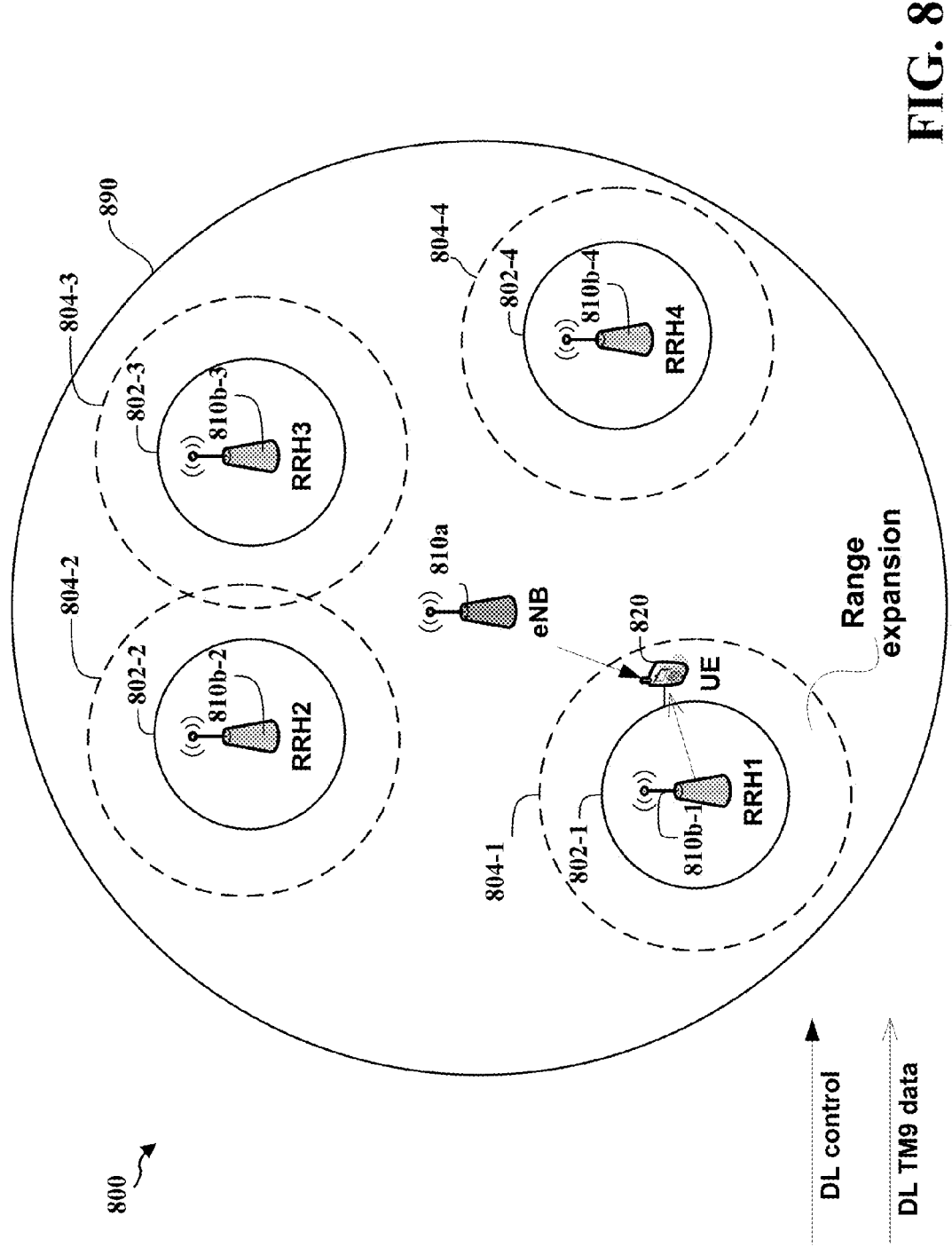
FIG. 8 is a diagram illustrating a CoMP scenario where all cells use different IDs.

FIG. 8 illustrates a heterogeneous CoMP scenario 800 for a coverage area 890 supported by an eNB 810a and a plurality of RRH1 810b-1 to RRH4 810b-4, each having different cell IDs. Each one of the RRH1 810b-1 to RRH4 810b-4 includes a respective cellular region 802-1 to 802-4. Each one of the RRH1 810b-1 to RRH4 810b-4 also includes a respective range expanded cellular region 804-1 to 804-4 that is expanded from the respective cellular region 802-1 to 802-4 through enhanced inter-cell interference coordination between the RRH1 810b-1 to RRH4 810b-4 and the macro eNB 810a, and through interference cancelation performed by a UE 820. In this scenario, cell splitting gain may be achieved by scheduling different users to different RRHs.

Figure 9:
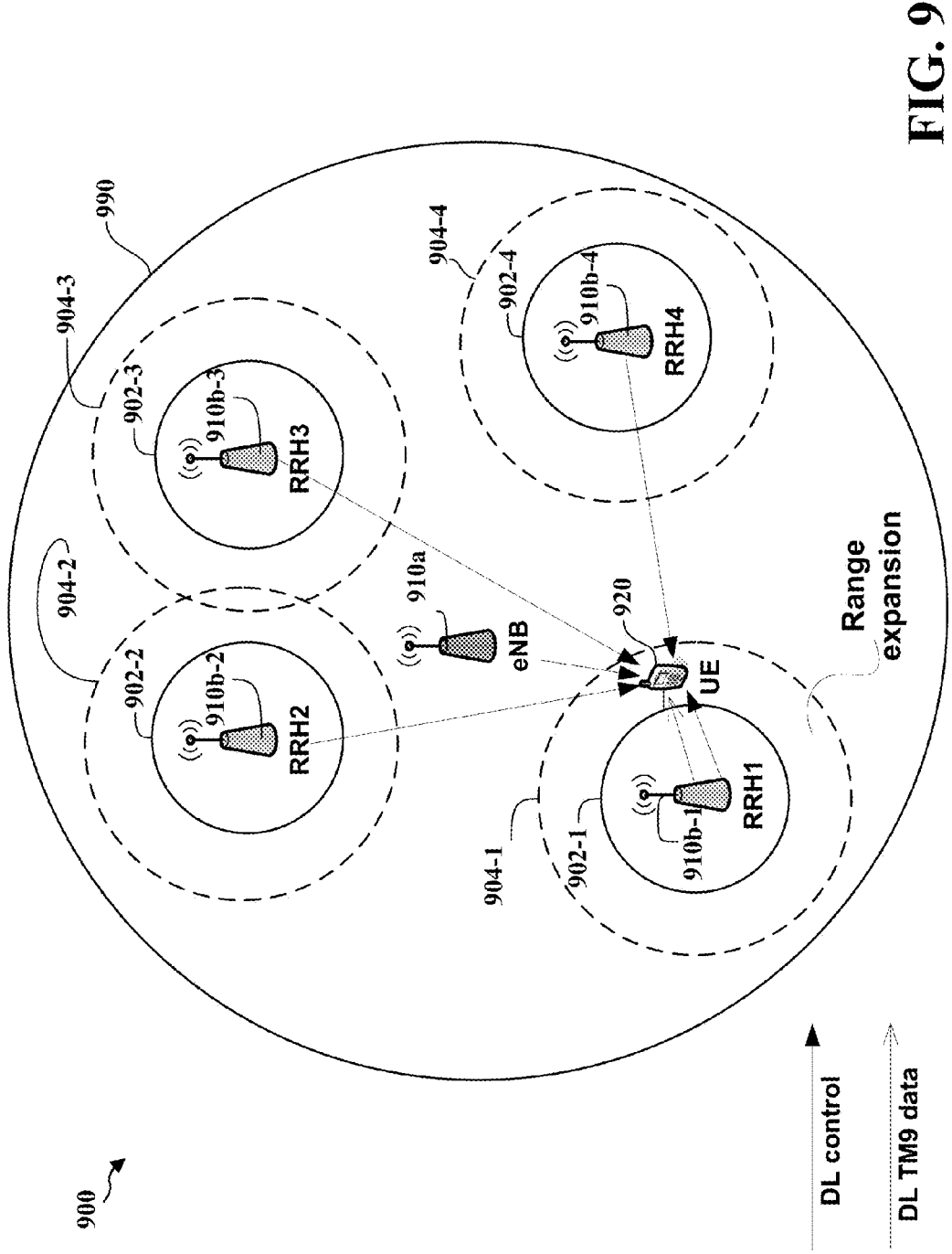
FIG. 9 is a diagram illustrating another CoMP scenario where all cells share the same IDs.

FIG. 9 illustrates another heterogeneous CoMP scenario 900 for a coverage area 990 supported by an eNB 910a and a plurality of RRH1 910b-1 to RRH4 910b-4, where all cells have the same ID. Similar to the CoMP scenario illustrated in FIG. 8, each one of the RRH1 910b-1 to RRH4 910b-4 includes a respective cellular region 902-1 to 902-4. Each one of the RRH1 910b-1 to RRH4 910b-4 also includes a respective range expanded cellular region 904-1 to 904-4 that is expanded from the respective cellular region 902-1 to 902-4 through enhanced inter-cell interference coordination between the RRH1 910b-1 to RRH4 910b-4 and the macro eNB 910a, and through interference cancelation performed by a UE 920. In this scenario, a Common Reference Signal (CRS) and control signal is received from all transmission points in the coordination area. Specifically, UE 920 receives control from all transmission points the eNB 910a and RRH1 910b-1 to RRH4 910b-4, and data from the RRH1 910b-1.

To reduce any unnecessary power used by a UE for UL transmissions to an eNB, the transmission power level used by the UE may be adjusted using transmission power control. The adjustment of the transmission power level for the UL may typically be based on a detected parameter such as the DL path loss of a transmission from the eNB, with the assumption that the DL path loss experienced by the UE would be indicative of the amount of power necessary to transmit in the UL. However, in the case of the CoMP scenario 800 as illustrated in FIG. 8 with no interference cancellation, the UE 820 will derive the DL path loss from the wrong source. The DL path loss information is used by the UE to set transmission power of an UL transmission. In this case, even though the DL path loss from the RRH1 810b-1 to the UE 820 is more representative of the conditions between them, the UE 820 will set its transmission power based on the DL path loss from the eNB 810a. As illustrated, although the UE 820 is physically closer to the RRH1 810b-1 than the UE 820 is to the eNB 810a and presumably requires a low UL transmission power from the UE 820, the UE 820 will incorrectly use the DL path loss from eNB 810a. This will result in the UE 820 to transmit UL at a higher transmission power than necessary and may cause interference with other nodes. Incorrect DL path loss information may result in inaccurate open loop power control. Such open loop power correction error needs to be addressed in order to have efficient UL operation. The same issue is avoided for interference cancellation-capable UEs as they may communicate with the RRH. On the other hand, a similar issue may be present in the case of CoMP scenario 900 as illustrated in FIG. 9, where the UE 920 will derive DL path loss from the wrong source, e.g., from a combination of eNB 910a and of RRH1 910b-1 to RRH4 910b-4, instead of RRH1 910b-1 alone.

Figure 10:
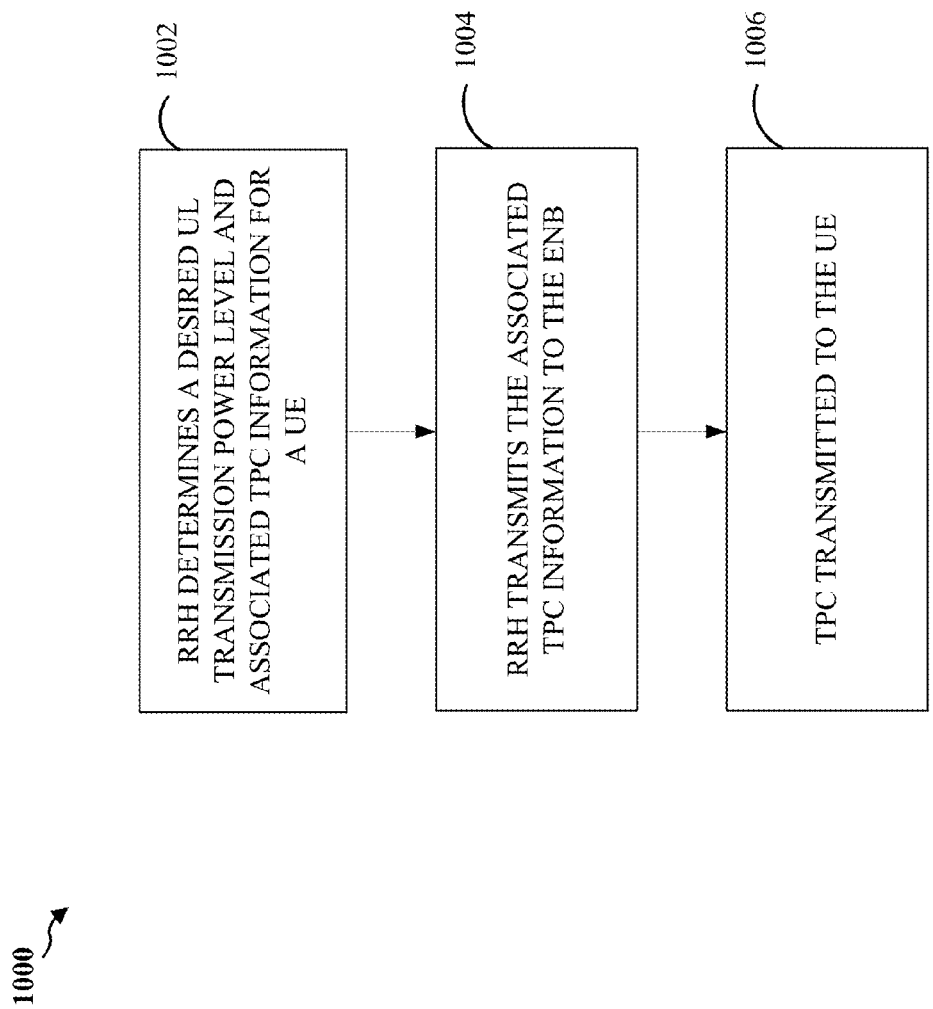
FIG. 10 is a flow diagram of a Transmission Power Control (TPC) process for controlling UL transmission power by a UE in a CoMP scenario.

FIG. 10 illustrates a UL power control for Physical Uplink Shared Channel (PUSCH) process 1000, where closed loop TPC may be used to compensate for the incorrect DL path loss information. Also referring to FIG. 11, which illustrates an RRH1 1110b-1, an eNB 1110a, and a UE 1120 in a configuration 1100 that represents a detail of a portion of FIGS. 8 and 9, at 1002 the RRH1 1110b-1 determines a desirable UL transmission power level and associated desired TPC information for the UE 1120. The eNB 1110a controls an area of coverage 1190.

At 1004, the RRH1 1110b-1 forwards the desired TPC information to the eNB 1110a in a backhaul communication 1162. In one aspect of the compensation, the desired TPC information transfer between the RRH1 1110b-1 and the eNB 1110a occurs with zero or very low delay, and centralized processing may be used to set the TPC that will be transmitted to the UE 1120. For example, in the CoMP scenario 900, where all points (i.e., the eNB 910a and the RRH1 910b-1 to RRH4 910b-4) transmit control information to the UE 920, a centralized determination at a node such as the eNB 910a will be made of the TPC that will be transmitted to the UE 920 based on the desired TPC information received from the RRH 910b-1. The TPC will then be communicated to all the other points (e.g., the RRH1 910b-1 to RRH4 910b-4) for transmission to the UE 920 along with the eNB 1110a transmission.

At 1006, the TPC will be transmitted in a control transmission 1176 to the UE 1120. For the CoMP scenario 800, the eNB 810a will transmit to the UE 820. For the CoMP scenario 900, all points (i.e., the eNB 910a and the RRH1 910b-1 to RRH4 910b-4) will transmit the TPC to the UE 920 so that UE 920 may transmit a UL PUSCH such as a UL PUSCH 1182 at the power level set by the TPC.

Figure 11:
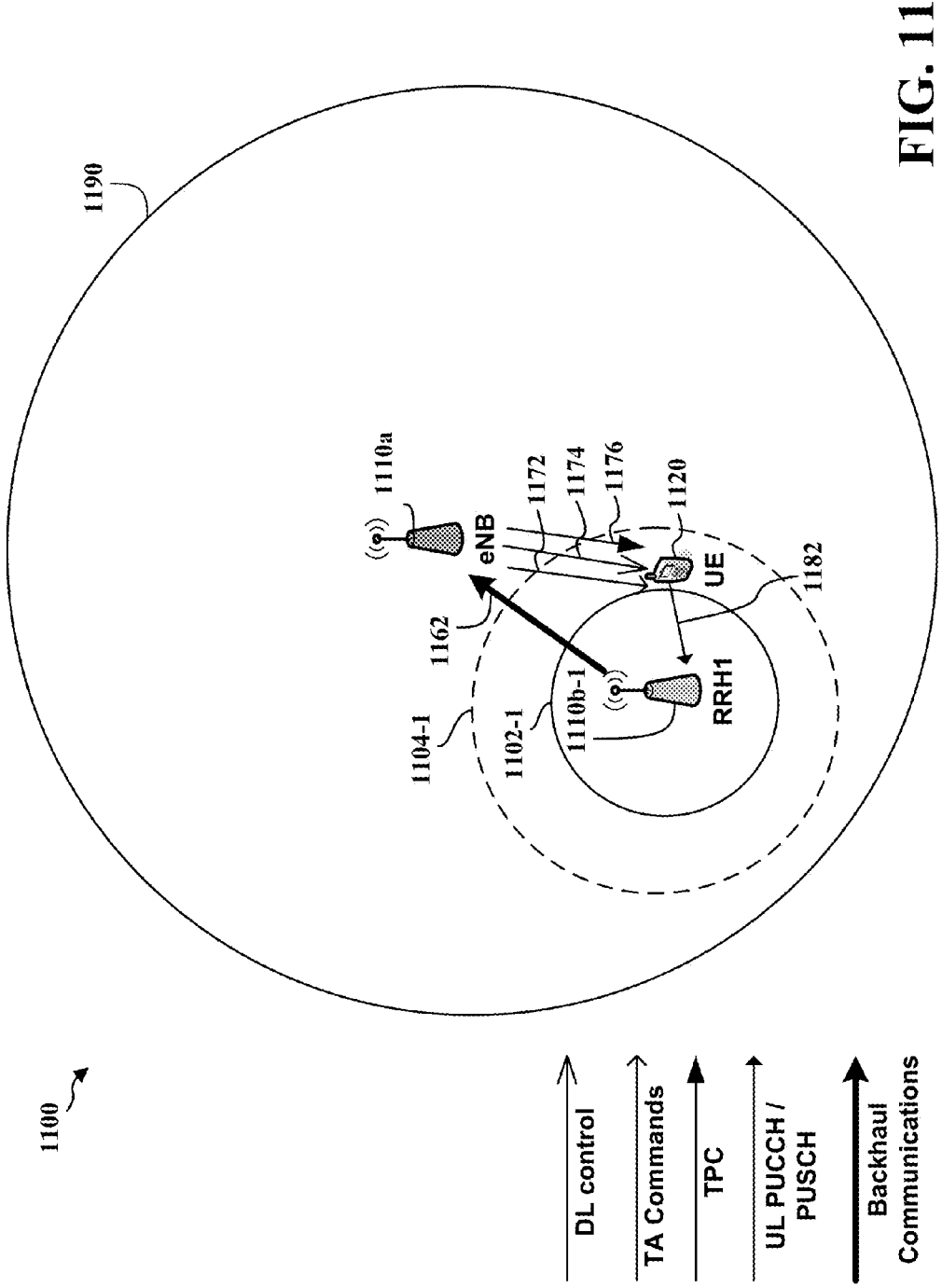
FIG. 11 is a diagram illustrating the operation of the process of FIG. 10.

Continuing to refer to FIG. 11, a closed loop TPC approach in conjunction with disabling open loop power control may be used to mitigate power control issues for UL transmissions. This can be applied to PUSCH, Physical Uplink Control Channel (PUCCH), and other UL signals (e.g., sounding reference signals, etc.). For UL PUSCH transmissions, it is possible to disable open loop power control using the existing standards. However, there is no standard approach for disabling open loop power control for the PUCCH. In one aspect of the power control for UL PUCCH, a new UE-specific parameter to disable open loop power control for PUCCH may be used to disable open loop power control. The parameter may be set depending on the location of the UE based on the RF characteristics and range expansion status.

Similar to the issue of the UE utilizing path loss information from the wrong source, in the case of the CoMP scenario 800 as illustrated in FIG. 8 with no interference cancellation, or the CoMP scenario 900 as illustrated in FIG. 9, a UE will derive DL timing from the wrong source, e.g., from an eNB instead of an RRH. The issue is avoided for interference cancellation-capable UEs as they may communicate with the RRH.

Figure 12:
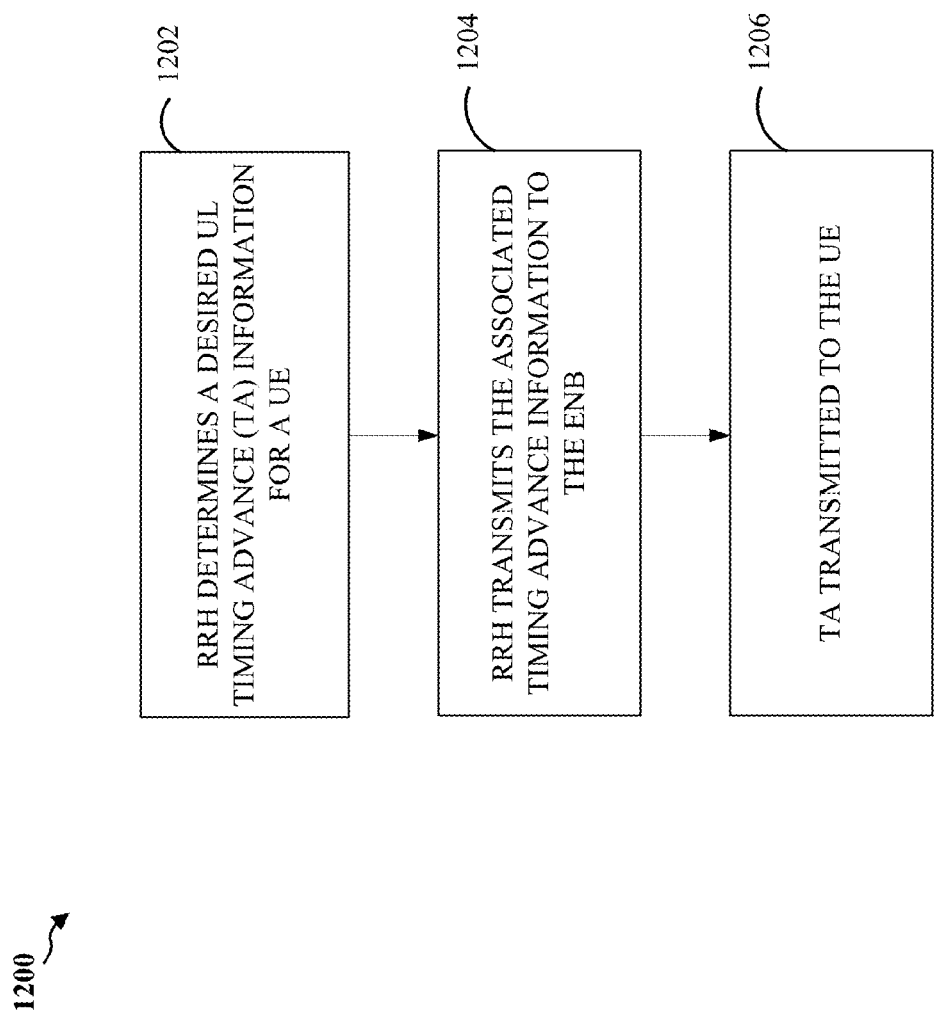
FIG. 12 is a flow diagram of a Timing Advance (TA) process for controlling UL TA.

A Timing Advance (TA) command may be used to compensate for any timing offset necessary. Referring to FIG. 12, which is a flow chart of a TA determination process 1200, and referring again to FIG. 11, at 1202 the RRH1 1110b-1 determines a desirable UL timing offset for the UE 1120 and transmits in one or more TA commands 1172.

Figure 13:
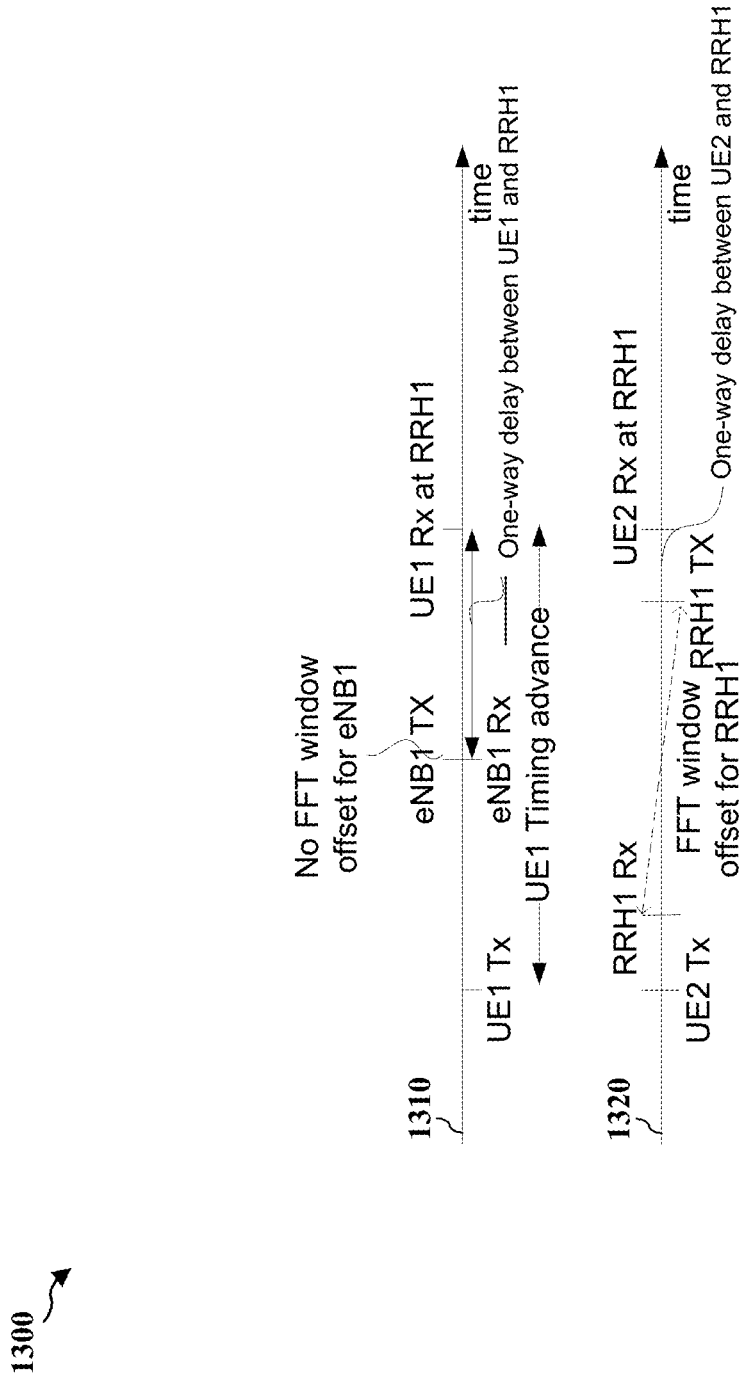
FIG. 13 is a timing diagram illustrating the operation of the TA process of FIG. 12.

FIG. 13 is a timing diagram 1300 illustrating an offset RRH system timeline 1320 relative to an absolute LTE system timeline 1310 in order to maximize alignment between received signals for first and second UEs. Referring to the offset RRH system timeline 1320, a Fast Fourier Transform (FFT) window offset may be introduced to the RRH. Meanwhile, referring to the absolute LTE system timeline 1310, no FFT window offset is provided for the eNB.

Still referring to FIG. 12, at 1204, the RRH1 1110b-1 forwards the desired TA information to the eNB 1110a in a backhaul communication 1162. In one aspect of the compensation, the desired TA information transfer between the RRH1 1110b-1 and the eNB 1110a occurs with zero or very low delay, and centralized processing may be used to set the TA that will be transmitted to the UE 1120. For example, in the CoMP scenario 900 of FIG. 9, where all points (i.e., the eNB 910a and the RRH1 910b-1 to RRH4 910b-4) transmit control information to the UE 920, a centralized determination at a node such as the eNB 910a will be made of the TA that will be transmitted to the UE 920 based on the desired TA information received from the RRH 910b-1. The TA will then be communicated to all the other points (e.g., the RRH1 910b-1 to RRH4 910b-4) for transmission to the UE 920 along with the eNB 1110a transmission.

At 1206, the TA will be transmitted in a control transmission 1176 to the UE 1120. For the CoMP scenario 800 of FIG. 8, the eNB 810a will transmit the TA control information to the UE 820. For the CoMP scenario 900 of FIG. 9, all points (i.e., the eNB 910a and the RRH1 910b-1 to RRH4 910b-4) will transmit the TA control information to the UE 920 so that the UE 920 may transmit UL signals at the timing offset based on the TA commands.

Figure 14:
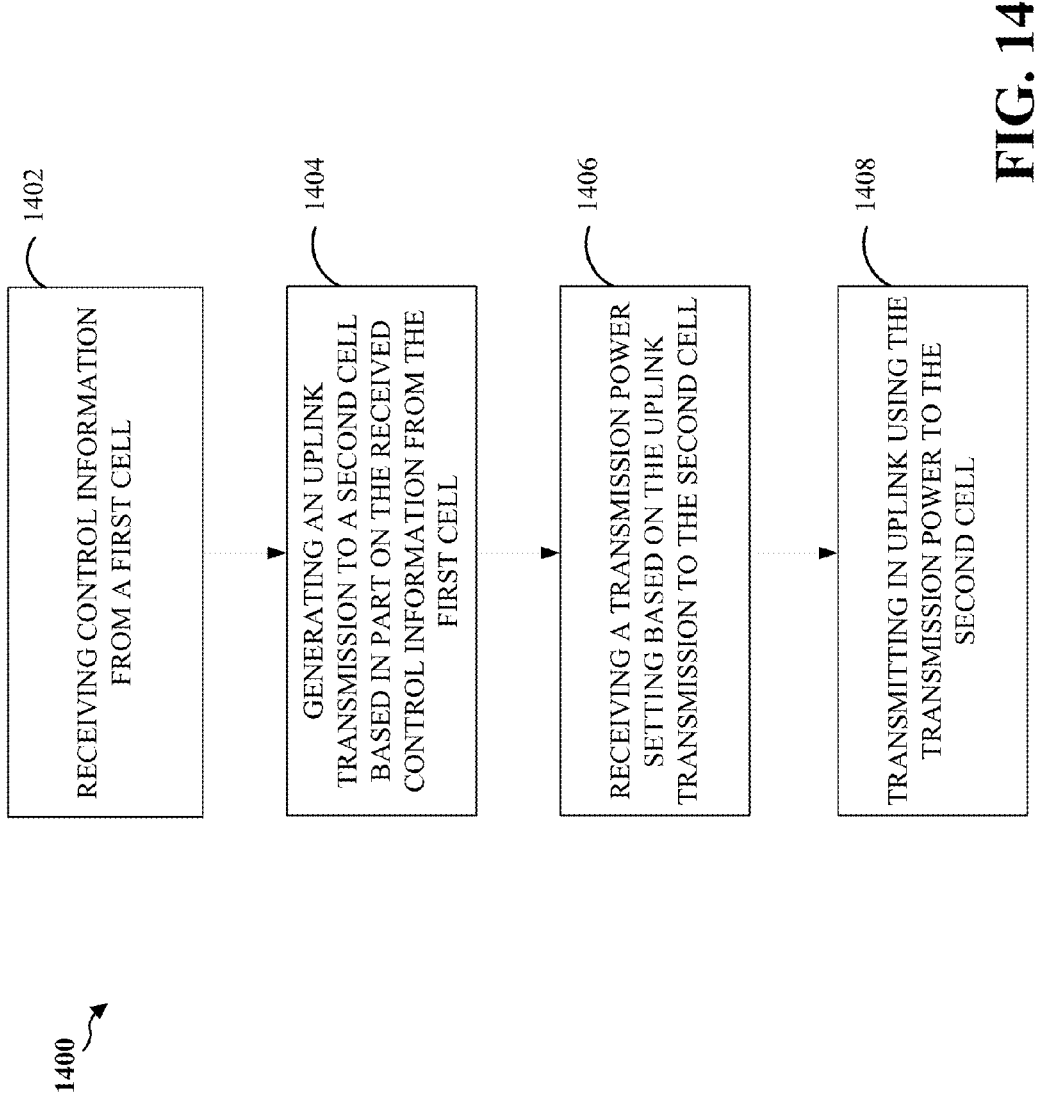
FIG. 14 is a flow chart of a method of wireless communication for the operation of a UE in CoMP scenarios.

FIG. 14 is a flow chart 1400 of a method of wireless communication based on various aspects of the power control disclosed herein. The method may be performed by a UE. At step 1402, the UE receives control information from a first cell such as an eNB. At step 1404, the UE generates an uplink transmission to a second cell such as an RRH based in part on the received control information from the first cell. For example, the UE may generate the uplink transmission by measuring a downlink path loss of a reference signal from the first cell and setting a transmission power for the uplink transmission to the second cell based on the measured downlink path loss. Here, the measured downlink path loss may be indicative of the amount of power necessary to transmit in the uplink. The UE may further receive transmission power control (TPC) information from the first cell for adjusting the transmission power. In another example, the UE may generate the uplink transmission by determining a downlink timing using the received control information from the first cell and setting an uplink timing for communicating the uplink transmission to the second cell based on the determined downlink timing. Here, the determined downlink timing may be indicative of the timing necessary to transmit in the uplink. The UE may further receive timing advance information from the first cell for adjusting the uplink timing.

At step 1406, the UE receives a transmission power setting based on the uplink transmission to the second cell. At step 1408, the UE transmits in uplink using the received transmission power to the second cell.

Figure 15:
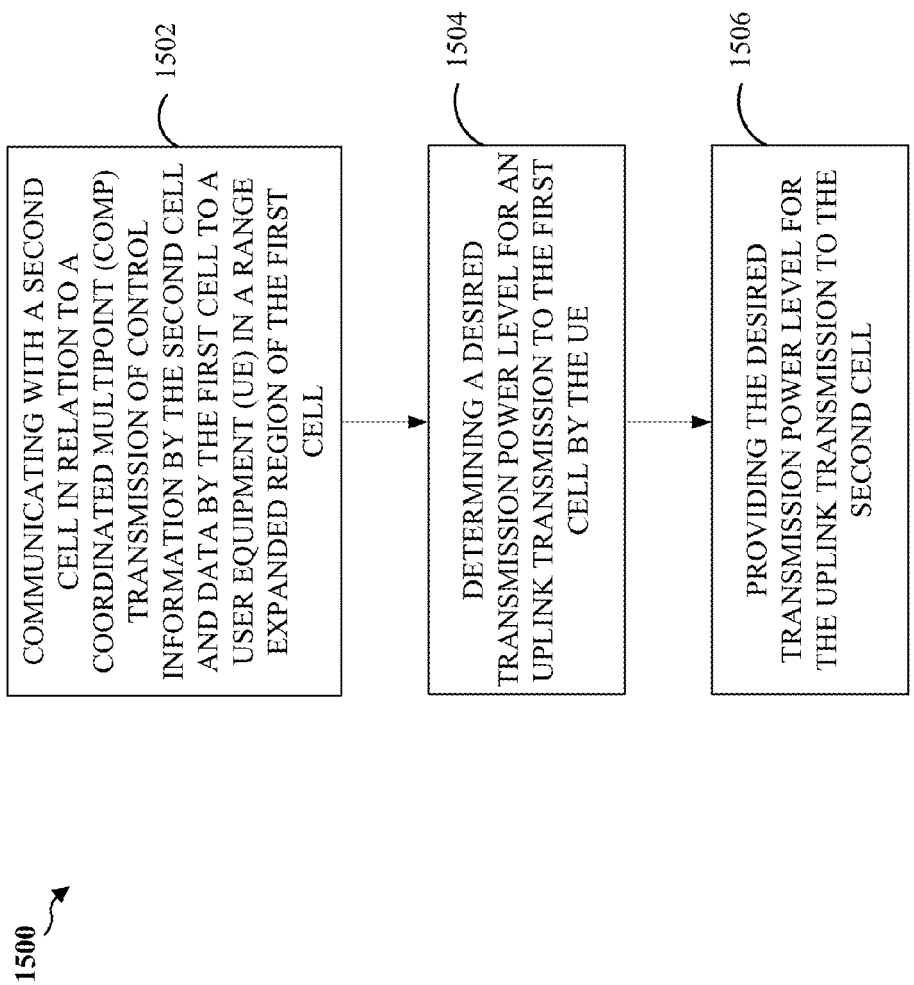
FIG. 15 is a flow chart of a method of wireless communication for the operation of an RRH in CoMP scenarios.

FIG. 15 is a flow chart 1500 of a method of wireless communication based on various aspects of the power control disclosed herein. The method may be performed by a first cell such as an RRH. At step 1502, the first cell communicates with a second cell such as an eNB in relation to a CoMP transmission of control information by the second cell and data by the first cell to a UE in a range expanded region of the first cell. At step 1504, the first cell determines a desired transmission power level for an uplink transmission to the first cell by the UE. For example, the first cell, based on its proximity to the UE, may determine the desired transmission power level for a UE transmission by determining a transmission power level at which the UE causes interference with other nodes, and setting the desired power level to a highest possible transmission power level that does not cause interference. At step 1506, the first cell provides the desired transmission power level for the uplink transmission to the second cell.

Figure 16:
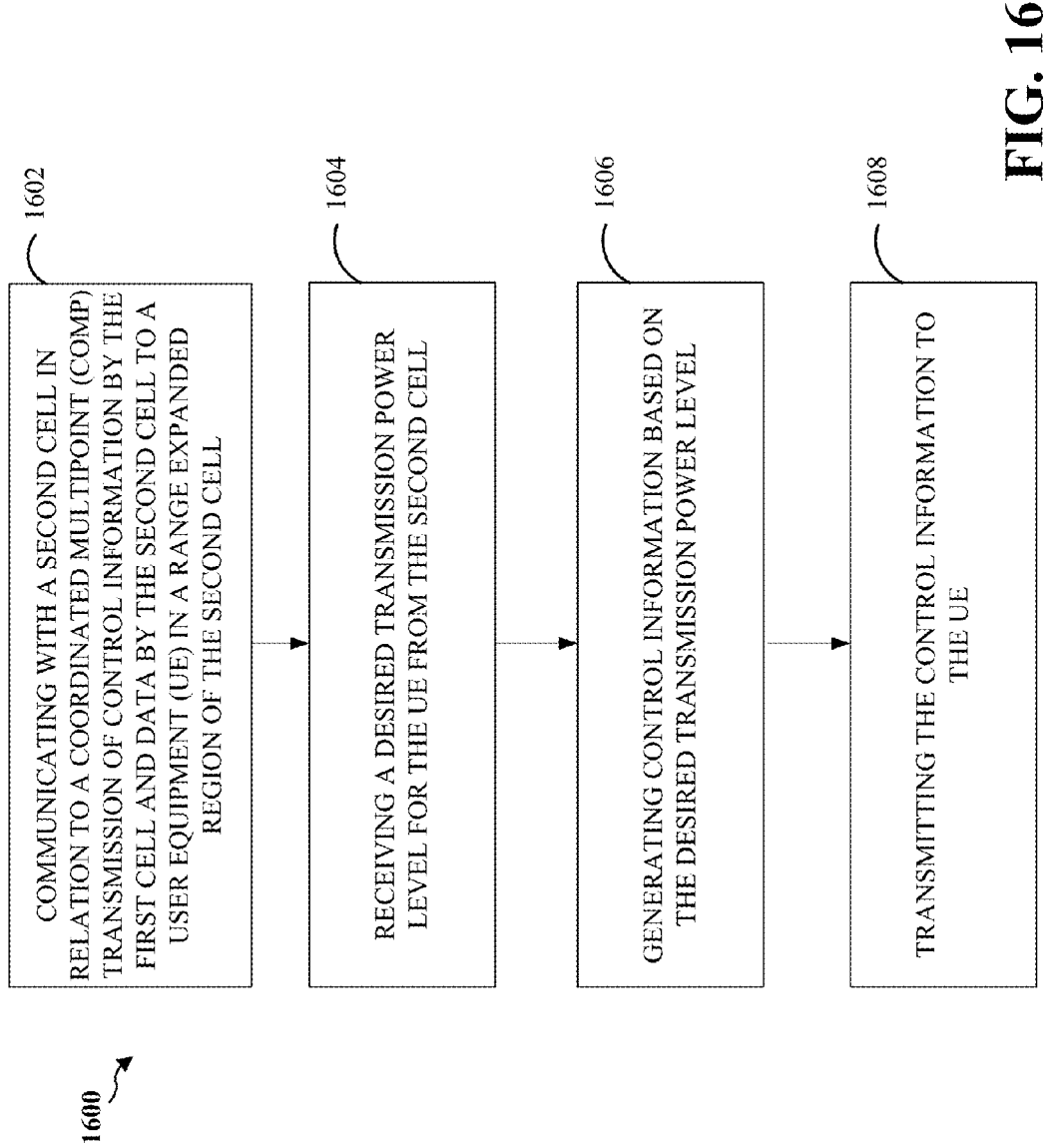
FIG. 16 is a flow chart of a method of wireless communication for the operation of an eNB in CoMP scenarios.

FIG. 16 is a flow chart 1600 of a method of wireless communication based on various aspects of the power control disclosed herein. The method may be performed by a first cell such as an eNB. At step 1602, the first cell communicates with a second cell such as an RRH in relation to a CoMP transmission of control information by the first cell and data by the second cell to a UE in a range expanded region of the second cell. At step 1604, the first cell receives a desired transmission power level for the UE from the second cell. At step 1606, the first cell generates control information based on the desired transmission power level. For example, the first cell receives information associated with a transmission power control (TPC) of the UE from the second cell, and generates the control information based on the information associated with the TPC of the UE to allow the UE to adjust an uplink transmission power. At step 1608, the first cell transmits the control information to the UE.

Figure 17:
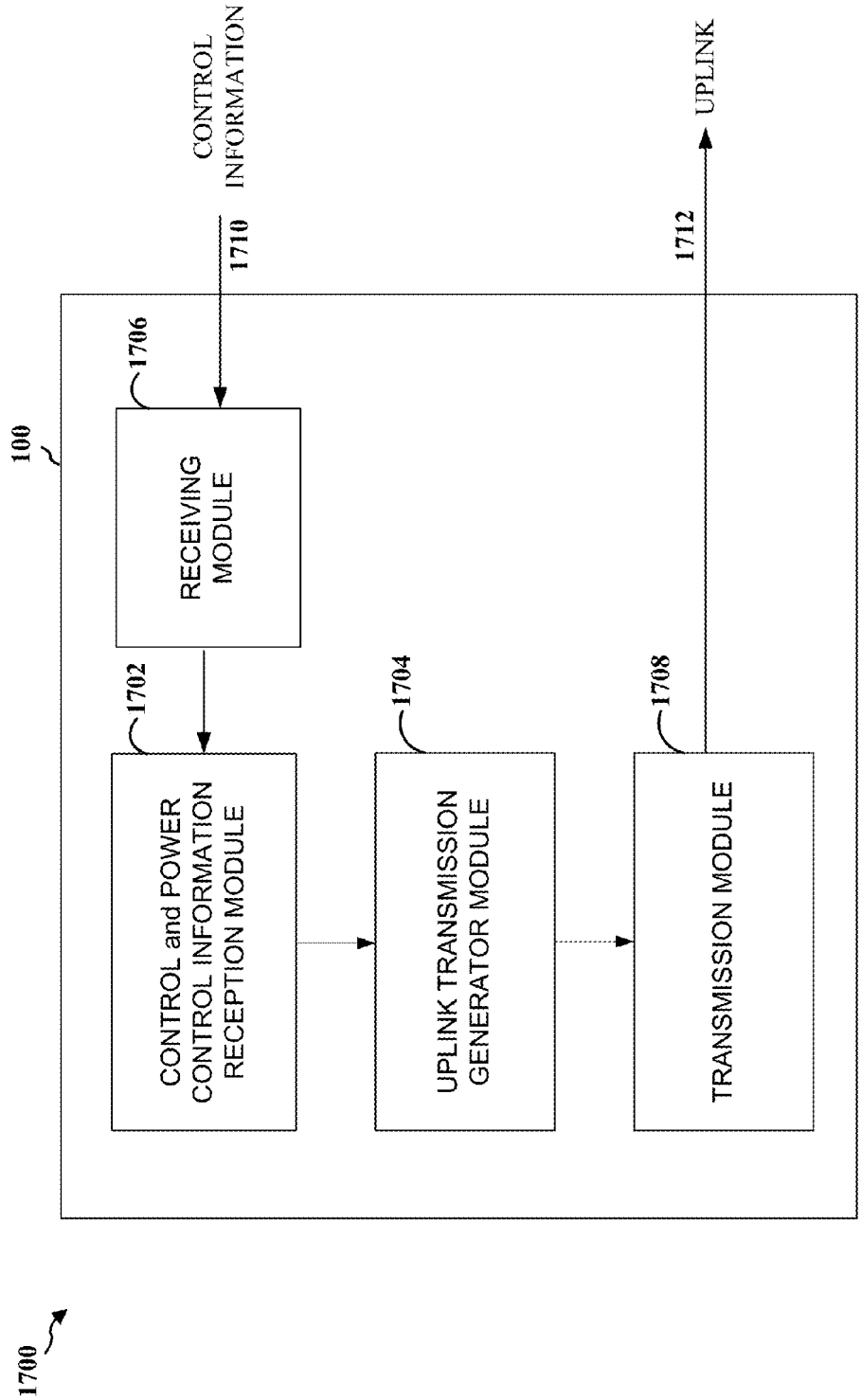
FIG. 17 is a conceptual data flow diagram illustrating the data flow between different modules in an exemplary apparatus that may be implemented for a UE.

FIG. 17 is a conceptual diagram 1700 illustrating the data flow between different modules in an exemplary apparatus 100. The apparatus 100 includes a module 1702 that receives control information 1710 from a first cell, and a module 1704 that generates an uplink transmission to a second cell based in part on the received control information from the first cell. For example, the module 1704 may generate the uplink transmission by determining a downlink path loss of a reference signal from the first cell and setting a transmission power for the uplink transmission to the second cell based on the determined downlink path loss. Here, the determined downlink path loss may be indicative of the amount of power necessary to transmit in the uplink. The module 1704 may further use transmission power control (TPC) information received from the first cell for adjusting the transmission power. In another example, the module 1704 may generate the uplink transmission by determining a downlink timing using the received control information from the first cell and setting an uplink timing for communicating the uplink transmission to the second cell based on the determined downlink timing. Here, the determined downlink timing may be indicative of the timing necessary to transmit in the uplink. The module 1704 may further use timing advance information received from the first cell for adjusting the uplink timing.

The module 1702 may also be configured to receive a transmission power setting based on the uplink transmission to the second cell. The module 1704 may transmit in uplink using the transmission power to the second cell. Transmissions may be made using a transmission module 1708, and reception may be made using a receiving module 1706. Although not described with respect to this figure, data may be received and transmitted as one of ordinary skill in the art would understand.

The apparatus may include additional modules that perform each of the steps of the algorithm in the aforementioned flow chart in FIG. 14. As such, each step in the aforementioned flow chart in FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
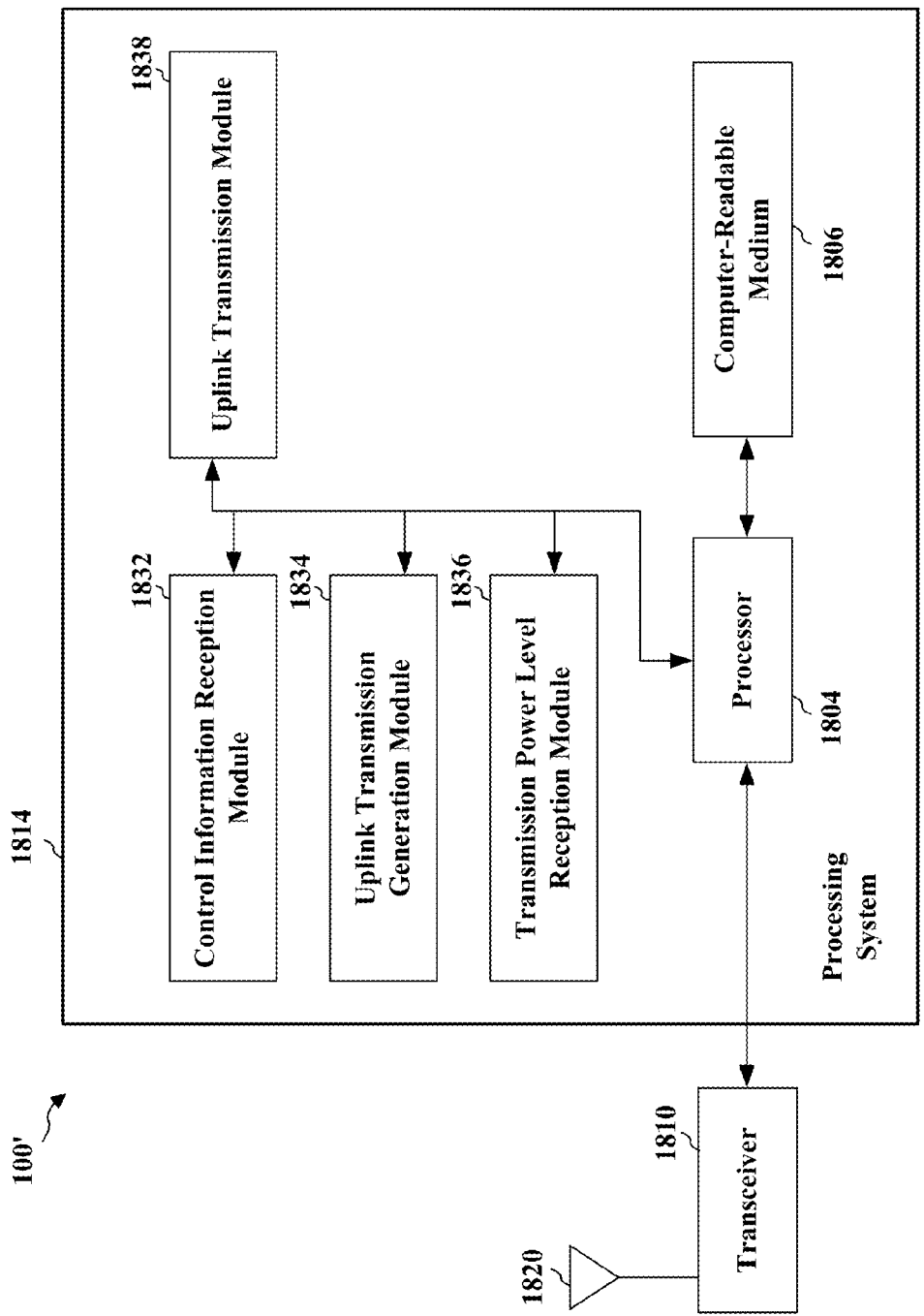
FIG. 18 is a diagram illustrating an example of a hardware implementation for an apparatus employing a processing system that may be implemented for a UE.

FIG. 18 is a diagram illustrating an example of a hardware implementation for an apparatus 100' employing a processing system 1814. The apparatus includes a processing system 1814 coupled to a transceiver 1810. The transceiver 1810 is coupled to one or more antennas 1820. The transceiver 1810 provides a means for communicating with various other apparatus over a transmission medium. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes a control information reception module 1832 for receiving control information from a first cell such as an eNB, an uplink transmission generation module 1834 for generating an uplink transmission to a second cell such as an RRH based in part on the received control information from the first cell, a transmission power level reception module 1836 for receiving a transmission power setting based on the uplink transmission to the second cell, and an uplink transmission 1838 for transmitting in uplink using the transmission power to the second cell. The modules may be software modules running in the processor 1804, resident/stored in the computer readable medium 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 100/100' for wireless communication includes means for receiving control information from a first cell; means for generating an uplink transmission to a second cell based in part on the received control information from the first cell; means for receiving a transmission power setting based on the uplink transmission to the second cell; and means for transmitting in uplink using the transmission power to the second cell. The aforementioned means may be one or more of the aforementioned modules of the apparatus 100 and/or the processing system 1814 of the apparatus 100' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 19:
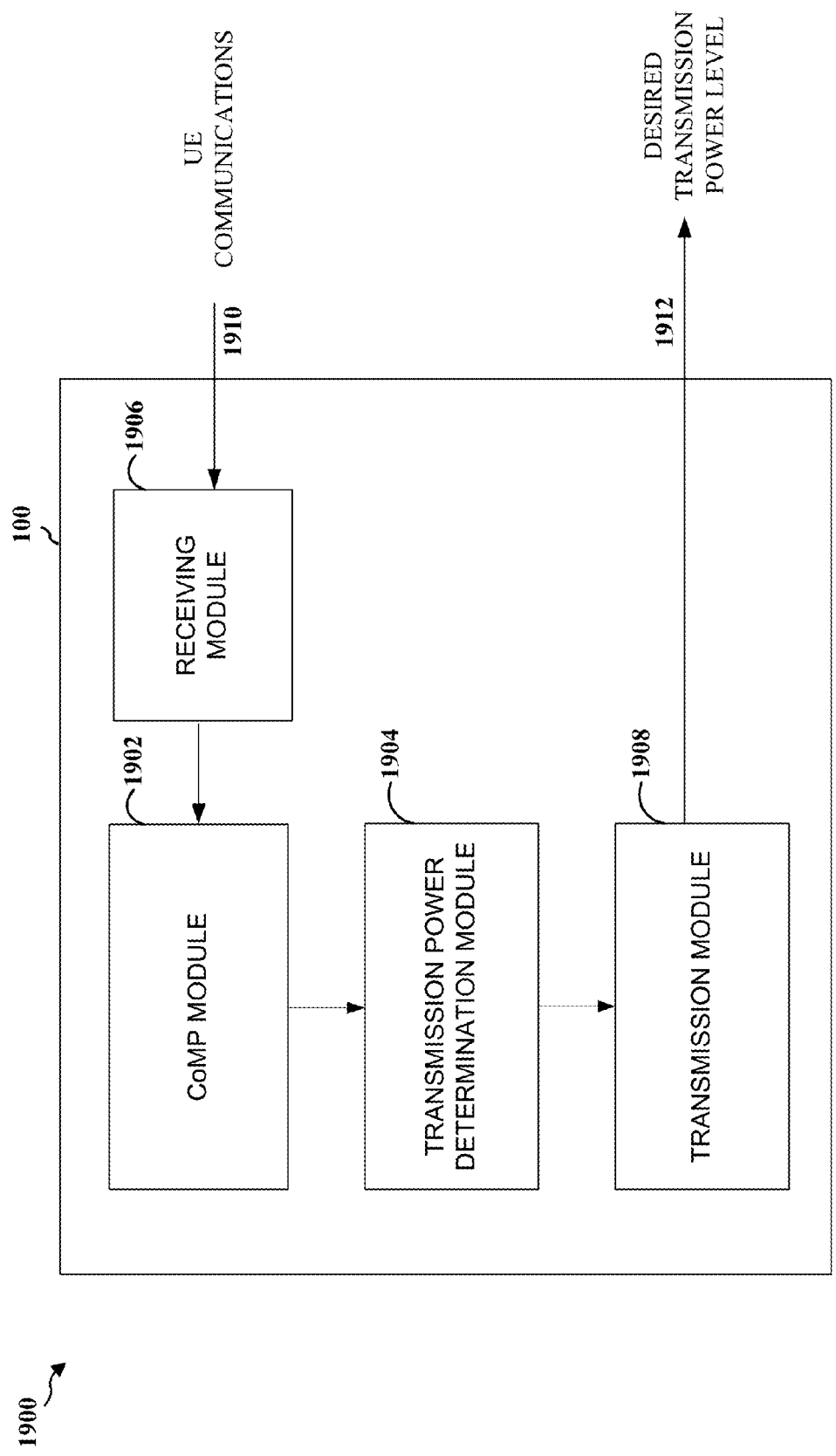
FIG. 19 is a conceptual data flow diagram illustrating the data flow between different modules in an exemplary apparatus that may be implemented for a Remote Radio Head (RRH).

FIG. 19 is a conceptual diagram 1900 illustrating the data flow between different modules in an exemplary apparatus 100 for a first cell such as an RRH. The apparatus 100 includes a module 1902 that communicates with a second cell such as an eNB in relation to a CoMP transmission of control information by the second cell and data by the first cell to a UE in a range expanded region of the first cell, and a module 1904 that determines a desired transmission power level for an uplink transmission to the first cell by the UE. For example, the module 1904, based on the apparatus 100's proximity to the UE, may determine the desired transmission power level for a UE transmission by determining a transmission power level at which the UE causes interference with other nodes, and setting the desired power level to a highest possible transmission power level that does not cause interference.

A module 1908 provides the desired transmission power level 1912 for the uplink transmission to the second cell. Other transmissions may be made using the transmission module 1908, and reception of such signals such as UE communications 1910 may be made using a receiving module 1906. Although not described with respect to this figure, data may be received and transmitted as one of ordinary skill in the art would understand.

The apparatus may include additional modules that perform each of the steps of the algorithm in the aforementioned flow charts FIG. 15. As such, each step in the aforementioned flow charts FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
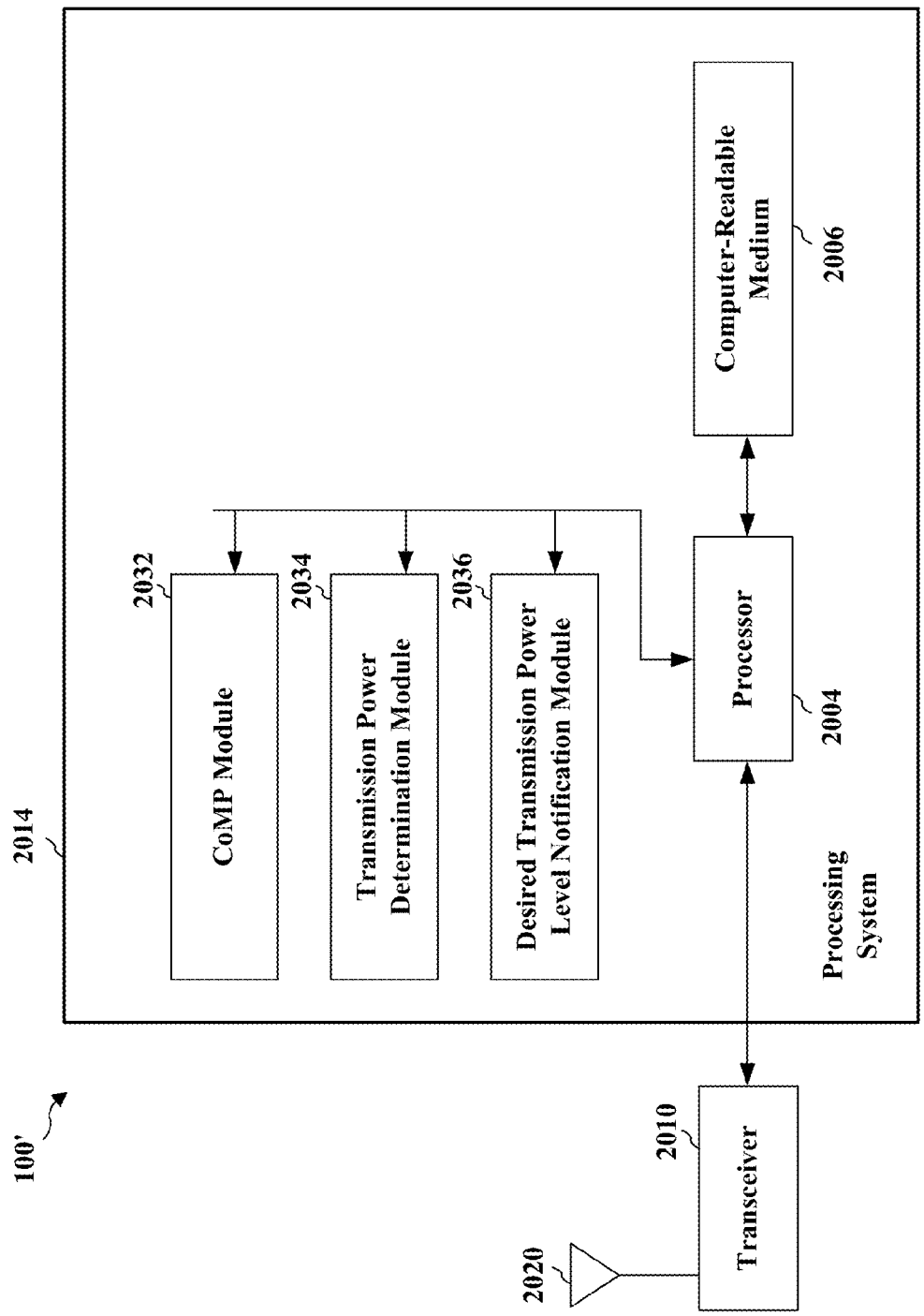
FIG. 20 is a diagram illustrating an example of a hardware implementation for an apparatus employing a processing system that may be implemented for an RRH.

FIG. 20 is a diagram illustrating an example of a hardware implementation for an apparatus 100' employing a processing system 2014. The apparatus includes a processing system 2014 coupled to a transceiver 2010. The transceiver 2010 is coupled to one or more antennas 2020. The transceiver 2010 provides a means for communicating with various other apparatus over a transmission medium. The processing system 2014 includes a processor 2004 coupled to a computer-readable medium 2006. The processor 2004 is responsible for general processing, including the execution of software stored on the computer-readable medium 2006. The software, when executed by the processor 2004, causes the processing system 2014 to perform the various functions described supra for any particular apparatus. The computer-readable medium 2006 may also be used for storing data that is manipulated by the processor 2004 when executing software. The processing system further includes a CoMP module 2032 for communicating with a second cell such as an eNB in relation to a CoMP transmission of control information by the second cell and data by the first cell to a UE in a range expanded region of the first cell, a transmission power determination module 2034 for determining a desired transmission power level for an uplink transmission to the first cell by the UE, and a desired transmission power level notification module 2036 for providing the desired transmission power level for the uplink transmission to the second cell. The modules may be software modules running in the processor 2004, resident/stored in the computer readable medium 2006, one or more hardware modules coupled to the processor 2004, or some combination thereof. The processing system 2014 may be a component of the eNB 610 and may include the memory 676 and/or at least one of the TX processor 616, the RX processor 670, and the controller/processor 675.

In one configuration, the apparatus 100/100' for wireless communication is a first cell such as a RRH that includes means for communicating with a second cell such as an eNB in relation to a CoMP transmission of control information by the second cell and data by the first cell to a user equipment (UE) in a range expanded region of the first cell; means for determining a desired transmission power level for an uplink transmission to the first cell by the UE; and means for providing the desired transmission power level for the uplink transmission to the second cell. The aforementioned means may be one or more of the aforementioned modules of the apparatus 100 and/or the processing system 2014 of the apparatus 100' configured to perform the functions recited by the aforementioned means. As described supra, the processing system 2014 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 21:
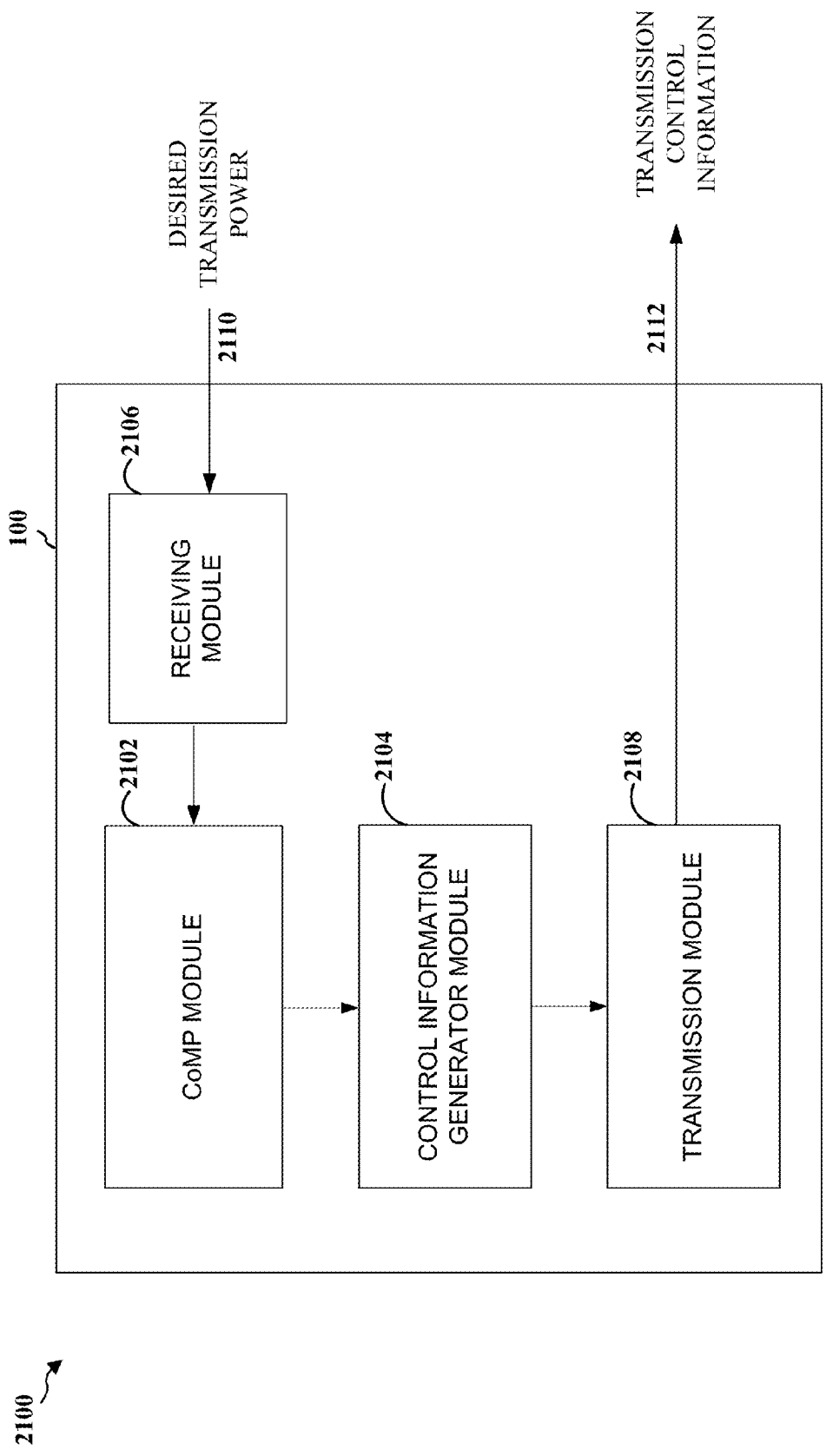
FIG. 21 is a conceptual data flow diagram illustrating the data flow between different modules in an exemplary apparatus that may be implemented for an eNB.

FIG. 21 is a conceptual diagram 2100 illustrating the data flow between different modules in an exemplary apparatus 100 such as a first cell that is an eNB. The apparatus 100 includes a module 2102 that communicates with a second cell such as an RRH in relation to a CoMP transmission of control information by the first cell and data by the second cell to a UE in a range expanded region of the second cell, a module 2106 that receives a desired transmission power level 2110 for the UE from the second cell, and a module 2104 that generates control information based on the desired transmission power level. For example, when the module 2106 receives information associated with a transmission power control (TPC) of the UE from the second cell, the module 2104 may generate the control information based on the information associated with the TPC of the UE to allow the UE to adjust an uplink transmission power.

Transmissions for such signals as control information 2112 may be made using a transmission module 2108, and reception may be made using a receiving module 2106. Although not described with respect to this figure, data may be received and transmitted as one of ordinary skill in the art would understand.

The apparatus may include additional modules that perform each of the steps of the algorithm in the aforementioned flow charts FIG. 16. As such, each step in the aforementioned flow charts FIG. 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
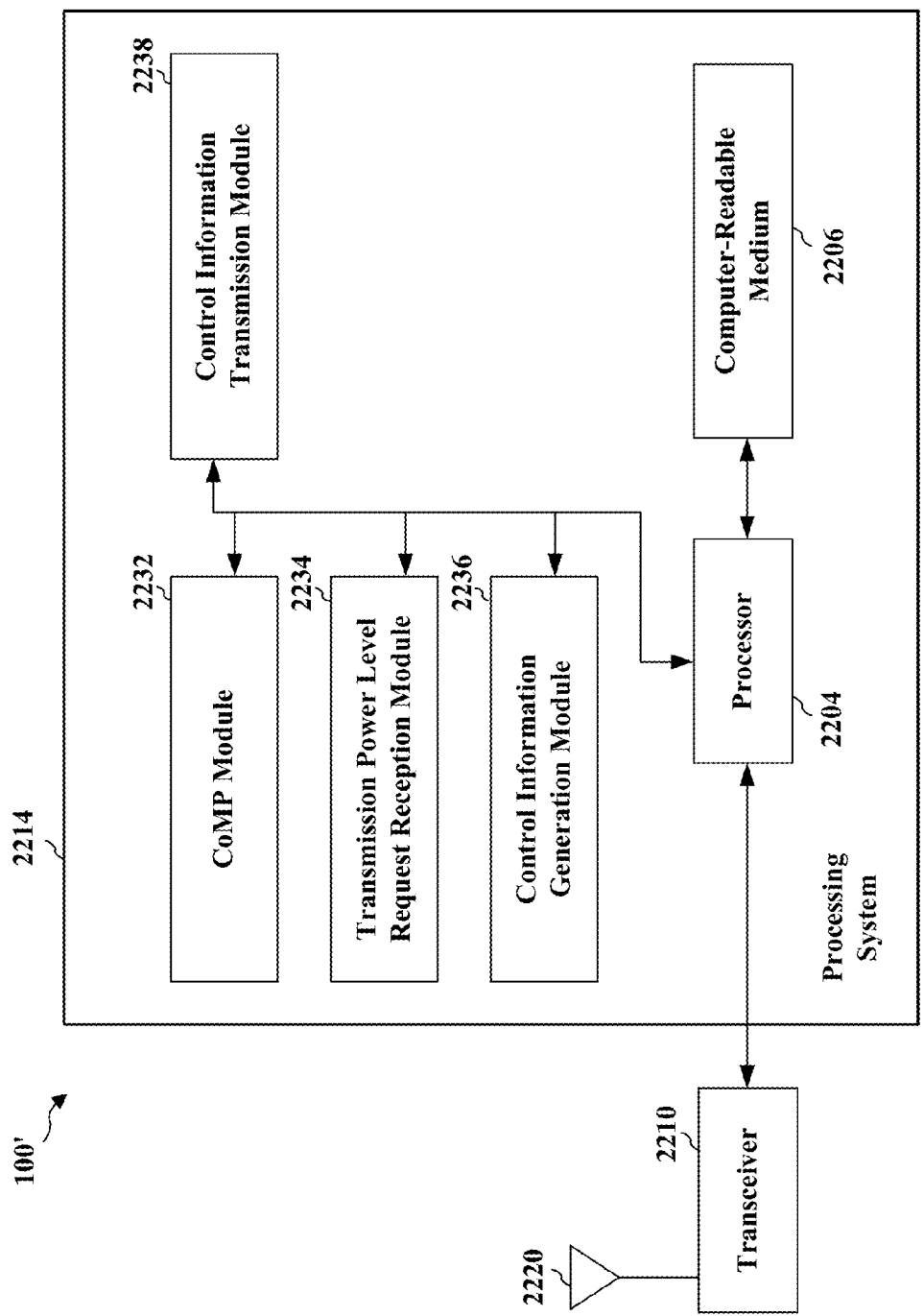
FIG. 22 is a diagram illustrating an example of a hardware implementation for an apparatus employing a processing system that may be implemented for an eNB.

FIG. 22 is a diagram illustrating an example of a hardware implementation for an apparatus 100' employing a processing system 2214. The apparatus includes a processing system 2214 coupled to a transceiver 2210. The transceiver 2210 is coupled to one or more antennas 2220. The transceiver 2210 provides a means for communicating with various other apparatus over a transmission medium. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes a module 2232 for communicating with a second cell in relation to a CoMP transmission of control information by the first cell and data by the second cell to a UE in a range expanded region of the second cell, a module 2234 receiving a desired transmission power level for the UE from the second cell, a module 2236 for generating control information based on the desired transmission power level, and a module 2208 for transmitting the control information to the UE. The modules may be software modules running in the processor 2204, resident/stored in the computer readable medium 2206, one or more hardware modules coupled to the processor 2204, or some combination thereof. The processing system 2214 may be a component of the eNB 610 and may include the memory 676 and/or at least one of the TX processor 616, the RX processor 670, and the controller/processor 675.

In one configuration, the apparatus 100/100' for wireless communication such as a first cell of an eNB includes means for communicating with a second cell such as an RRH in relation to a CoMP transmission of control information by the first cell and data by the second cell to a UE in a range expanded region of the second cell; receiving a desired transmission power level for the UE from the second cell; generating control information based on the desired transmission power level; and transmitting the control information to the UE. The aforementioned means may be one or more of the aforementioned modules of the apparatus 100 and/or the processing system 2214 of the apparatus 100' configured to perform the functions recited by the aforementioned means. As described supra, the processing system 2214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It should be understood that although power control information is used to describe the various aspects of the control information transmitted to the UEs herein, timing advancement or adjustment information may also be used in the control information for controlling the UEs, RRH, or other nodes of a network implementing the various approaches described herein.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first cell, comprising:
    disabling open loop power control based on a range expansion status of a user equipment (UE) in a range expanded region of the first cell, wherein the range expansion status indicates a location of the UE with respect to the range expanded region of the first cell;
    communicating with a second cell in relation to a coordinated multipoint (CoMP) transmission of control information by the second cell and of data by the first cell to the UE in the range expanded region of the first cell;
    determining by the first cell a desired transmission power level for an uplink transmission to the first cell by the UE; and
    providing the desired transmission power level for the uplink transmission to the second cell.

2. The method of claim 1, wherein providing the desired transmission power level comprises providing transmission power control (TPC) information to the second cell, the TPC information being for the UE for setting a transmission power of the uplink transmission.

3. The method of claim 1, further comprising receiving an uplink transmission from the UE based in part on the CoMP transmission of control information by the second cell.

4. The method of claim 1, further comprising transmitting the control information to the UE, wherein the first cell and the second cell have a same cell identifier.

5. The method of claim 1, wherein the first cell is a low-power evolved Node B (eNB) and the second cell is a high-power eNB.

6. The method of claim 1, further comprising communicating timing advance information to the second cell based on a received uplink transmission from the UE, the timing advance information being for the UE for adjusting an uplink timing of the uplink transmission.

7. The method of claim 6, further comprising:
    receiving a second uplink transmission from a second UE; and adjusting a system timeline of the second cell in order to improve an alignment between the uplink transmission from the UE and the second uplink transmission from the second UE.

8. An apparatus for wireless communication of a first cell, comprising:
    means for disabling open loop power control based on a range expansion status of a user equipment (UE) in a range expanded region of the first cell, wherein the range expansion status indicates a location of the UE with respect to the range expanded region of the first cell;
    means for communicating with a second cell in relation to a coordinated multipoint (CoMP) transmission of control information by the second cell and of data by the first cell to the UE in the range expanded region of the first cell;
    means for determining a desired transmission power level for an uplink transmission to the first cell by the UE; and
    means for providing the desired transmission power level for the uplink transmission to the second cell.

9. The apparatus of claim 8, wherein the desired transmission power level comprises transmission power control (TPC) information, the TPC information being for the UE for setting a transmission power of the uplink transmission.

10. The apparatus of claim 8, further comprising means for receiving an uplink transmission from the UE based in part on the CoMP transmission of control information by the second cell.

11. The apparatus of claim 8, further comprising means for transmitting the control information to the UE, wherein the first cell and the second cell have a same cell identifier.

12. The apparatus of claim 8, wherein the first cell is a low-power evolved Node B (eNB) and the second cell is a high-power eNB.

13. The apparatus of claim 8, further comprising means for communicating timing advance information to the second cell based on a received uplink transmission from the UE, the timing advance information being for the UE for adjusting an uplink timing of the uplink transmission.

14. The apparatus of claim 13, further comprising:
    means for receiving a second uplink transmission from a second UE; and
    means for adjusting a system timeline of the second cell in order to improve an alignment between the uplink transmission from the UE and the second uplink transmission from the second UE.

15. A non-transitory computer-readable medium comprising code that when executed on at least one processor causes the at least one processor to:
    disable open loop power control based on a range expansion status of a user equipment (UE) in a range expanded region of the first cell, wherein the range expansion status indicates a location of the UE with respect to the range expanded region of the first cell;
    communicate with a second cell in relation to a coordinated multipoint (CoMP) transmission of control information by the second cell and of data by a first cell to the UE in the range expanded region of the first cell;
    determine by the first cell a desired transmission power level for an uplink transmission to the first cell by the UE; and
    provide the desired transmission power level for the uplink transmission to the second cell.

16. The non-transitory computer-readable medium of claim 15, wherein the code that when executed on the at least one processor causes the at least one processor to provide the desired transmission power level comprises code that when executed on the at least one processor causes the at least one processor to provide transmission power control (TPC) information to the second cell, the TPC information being for the UE for setting a transmission power of the uplink transmission.

17. The non-transitory computer-readable medium of claim 15, further comprising code that when executed on the at least one processor causes the at least one processor to receive an uplink transmission from the UE based in part on the CoMP transmission of control information by the second cell.

18. The non-transitory computer-readable medium of claim 15, further comprising code that when executed on the at least one processor causes the at least one processor to transmit the control information to the UE, wherein the first cell and the second cell have a same cell identifier.

19. The non-transitory computer-readable medium of claim 15, wherein the first cell is a low-power evolved Node B (eNB) and the second cell is a high-power eNB.

20. The non-transitory computer-readable medium of claim 15, further comprising code that when executed on the at least one processor causes the at least one processor to communicate timing advance information to the second cell based on a received uplink transmission from the UE, the timing advance information being for the UE for adjusting an uplink timing of the uplink transmission.

21. The non-transitory computer-readable medium of claim 20, further comprising code that when executed on the at least one processor causes the at least one processor to:
    receive a second uplink transmission from a second UE; and
    adjust a system timeline of the second cell in order to improve an alignment between the uplink transmission from the UE and the second uplink transmission from the second UE.

22. An apparatus for wireless communication of a first cell, comprising:
    a processing system configured to:
    disable open loop power control based on a range expansion status of a user equipment (UE) located in a range expanded region of the first cell, wherein the range expansion status indicates a location of the UE with respect to the range expanded region of the first cell;
    communicate with a second cell in relation to a coordinated multipoint (CoMP) transmission of control information by the second cell and of data by the first cell to the UE in the range expanded region of the first cell;
    determine by the first cell a desired transmission power level for an uplink transmission to the first cell by the UE; and
    provide the desired transmission power level for the uplink transmission to the second cell.

23. The apparatus of claim 22, providing the desired transmission power level comprises providing transmission power control (TPC) information to the second cell, the TPC information being for the UE for setting a transmission power of the uplink transmission.

24. The apparatus of claim 22, wherein the processing system is further configured to receive an uplink transmission from the UE based in part on the CoMP transmission of control information by the second cell.

25. The apparatus of claim 22, wherein the processing system is further configured to transmit the control information to the UE, wherein the first cell and the second cell have a same cell identifier.

26. The apparatus of claim 22, wherein the first cell is a low-power evolved Node B (eNB) and the second cell is a high-power eNB.

27. The apparatus of claim 22, wherein the processing system is further configured to communicate timing advance information to the second cell based on a received uplink transmission from the UE, the timing advance information being for the UE for adjusting an uplink timing of the uplink transmission.

28. The apparatus of claim 27, wherein the processing system is further configured to:
 receive a second uplink transmission from a second UE; and
 adjust a system timeline of the second cell in order to improve an alignment between the uplink transmission from the UE and the second uplink transmission from the second UE.

* * * * *